United States Patent [19]
Chujoh et al.

[11] Patent Number: 6,002,802
[45] Date of Patent: Dec. 14, 1999

[54] VIDEO ENCODING AND DECODING APPARATUS

[75] Inventors: Takeshi Chujoh; Takeshi Nagai, both of Tokyo; Yoshihiro Kikuchi, Yokohama; Kenshi Dachiku, Kawasaki, all of Japan

[73] Assignee: Kabushiki Kaisha Toshiba, Kawasaki, Japan

[21] Appl. No.: 08/736,240

[22] Filed: Oct. 24, 1996

[30] Foreign Application Priority Data

Oct. 27, 1995 [JP] Japan .................................. 7-280911
Oct. 27, 1995 [JP] Japan .................................. 7-281027

[51] Int. Cl.⁶ ...................................................... G06K 9/34
[52] U.S. Cl. ............................................................ 382/236
[58] Field of Search ...................... 348/390, 394, 348/402, 403, 409, 411, 412, 415, 420, 424, 431; 358/432, 433; 382/232, 236, 239, 248, 250

[56] References Cited

U.S. PATENT DOCUMENTS

| | | | |
|---|---|---|---|
| 4,692,801 | 9/1987 | Ninoyima et al. | 348/415 |
| 5,144,427 | 9/1992 | Kiatura et al. | 348/424 |
| 5,241,383 | 8/1993 | Chen et al. | |
| 5,241,401 | 8/1993 | Fujiwara et al. | |
| 5,267,334 | 11/1993 | Normille et al. | 382/236 |
| 5,347,308 | 9/1994 | Wai | 348/394 |
| 5,534,929 | 7/1996 | Tanaka. | |
| 5,644,660 | 7/1997 | Bruder | 382/236 |
| 5,661,523 | 8/1997 | Yamane | 348/390 |

FOREIGN PATENT DOCUMENTS 0 545 874   6/1993   European Pat. Off. .

OTHER PUBLICATIONS

Amy R. Reibman and Barry G. Haskell, "Constraints on Variable Bit–Rate Video for ATM Networks", Dec. 2, 1992, IEEE Transactions on Circuits and Systems for Video Technology, No. 4, New York; pp. 361–372.

Patent Abstracts of Japan vol. 095, No. 004, May 31, 1995 & JP 07 030589 A (Canon Inc.), Jan. 31, 1995 *abstract*.

*Primary Examiner*—Jose L. Couso
*Attorney, Agent, or Firm*—Oblon, Spivak McClelland, Maier & Neustadt, P.C.

[57] ABSTRACT

An encoding apparatus comprising a encoder for encoding an input video signal, thereby generating encoded data, an output buffer for receiving the encoded data and outputting the data at a predetermined transmission rate, and an encoding control circuit for selecting a frame to be encoded. In the encoding control circuit, the target number of bits for each frame is calculated on the basis of the encoding bit rate, the encoding frame rate and the limits of delay, all of which are set externally. The number of encoded bits, thus calculated, is compared with the target number of encoded bits. A quantizer and a switch are controlled in accordance with the difference between the number of encoded code and the target number of encoded bits, thereby adjusting a quantization parameter and the number of frames which are to be skipped.

14 Claims, 17 Drawing Sheets

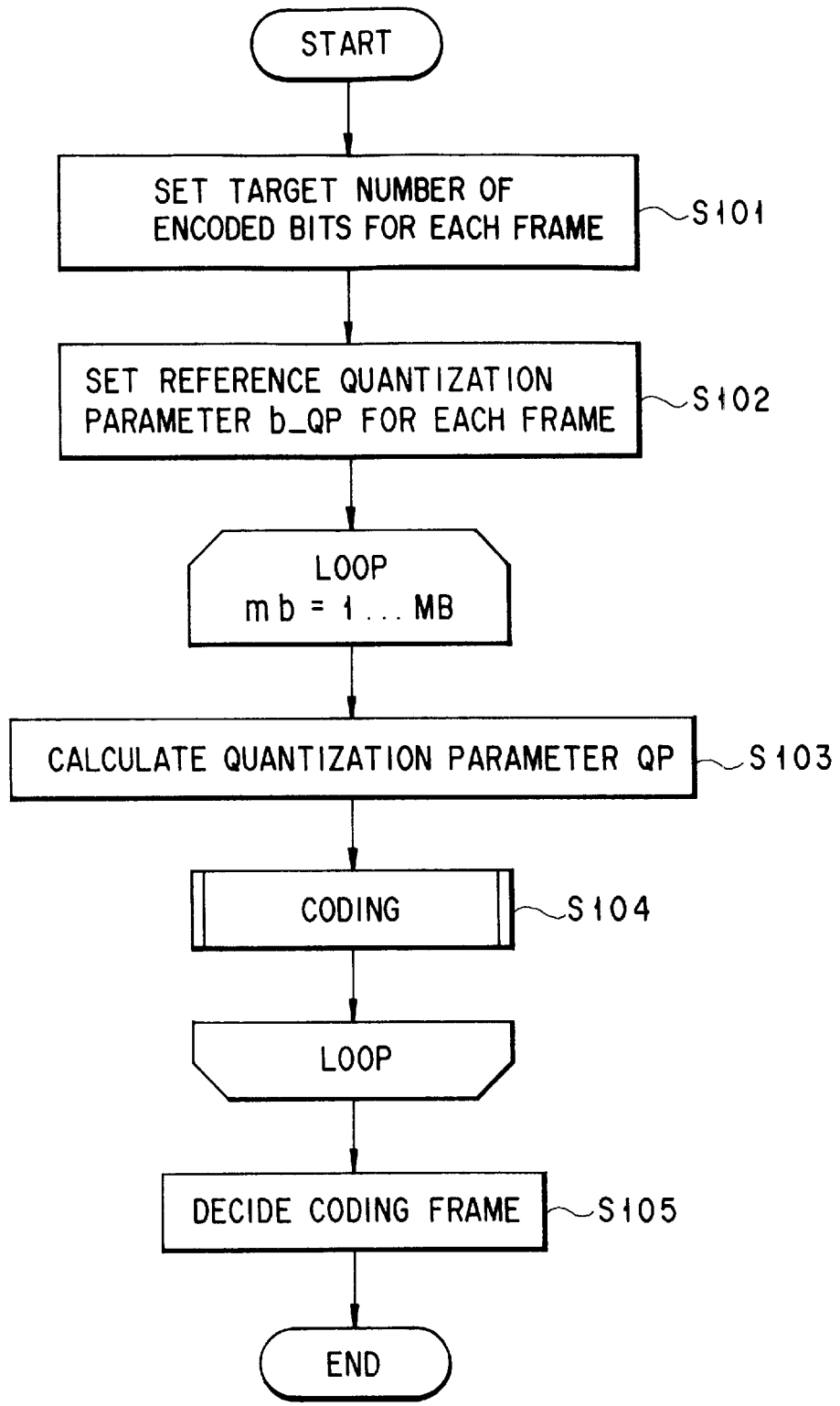
F I G. 3

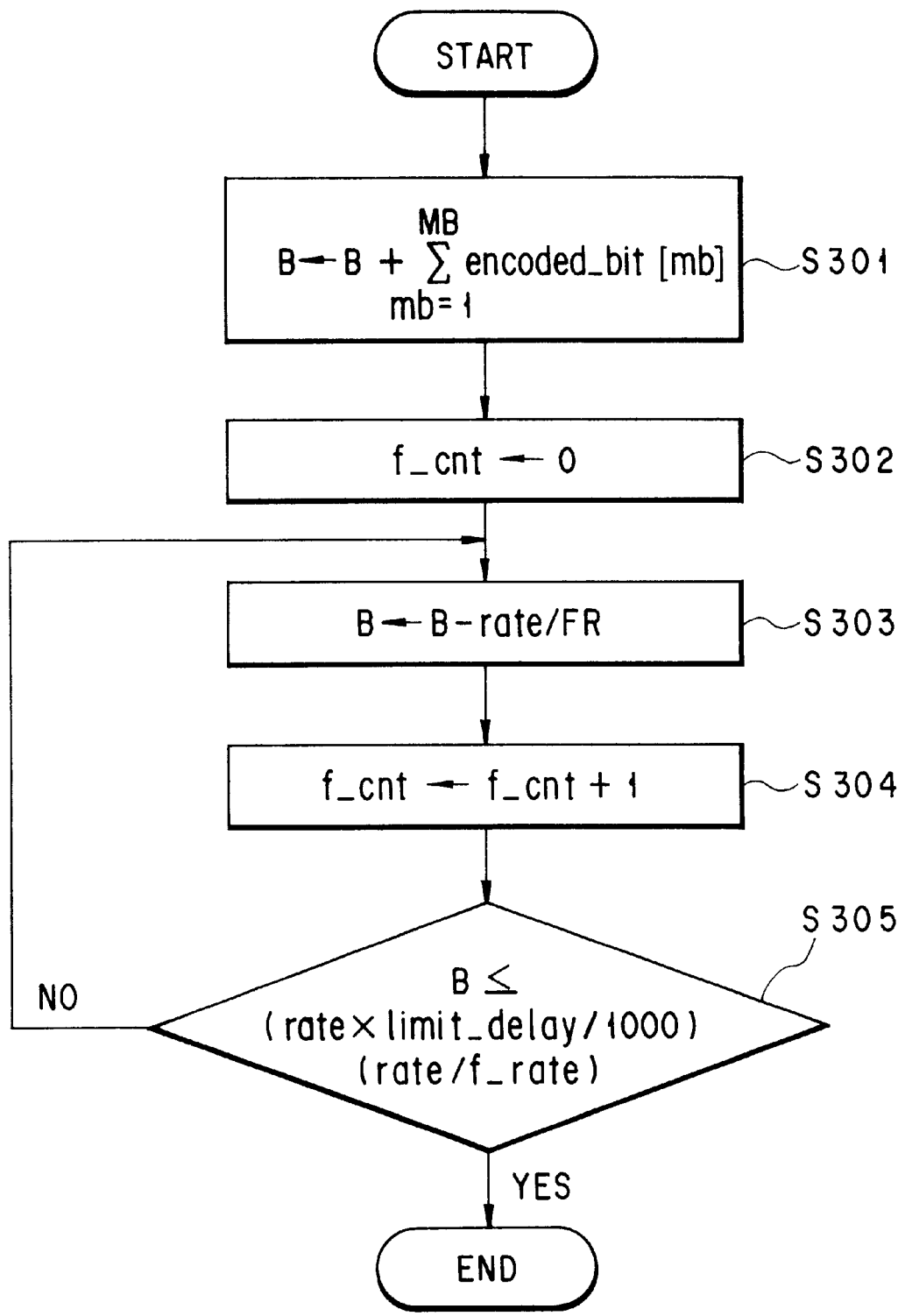
F I G. 5

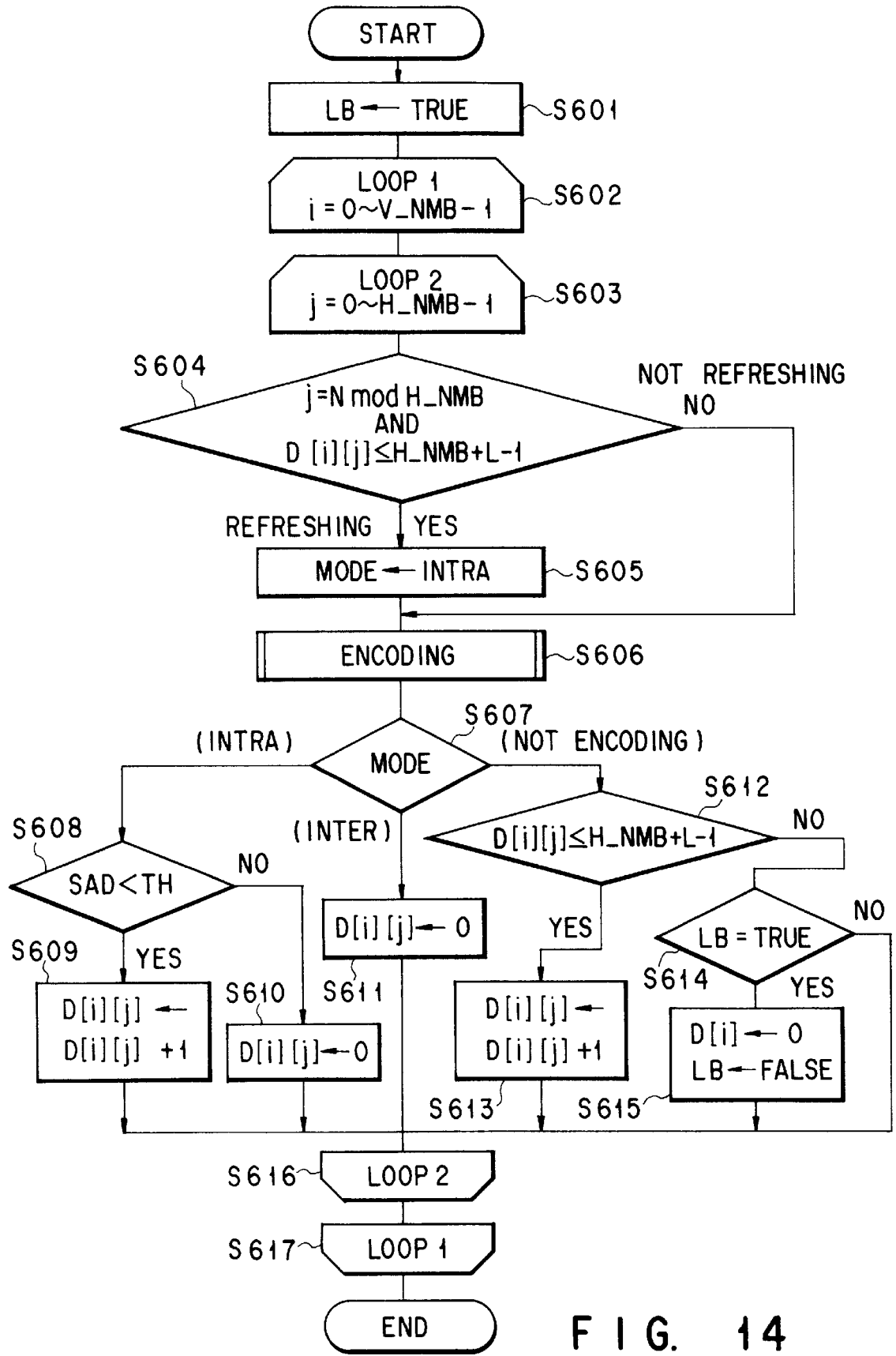
F I G. 14

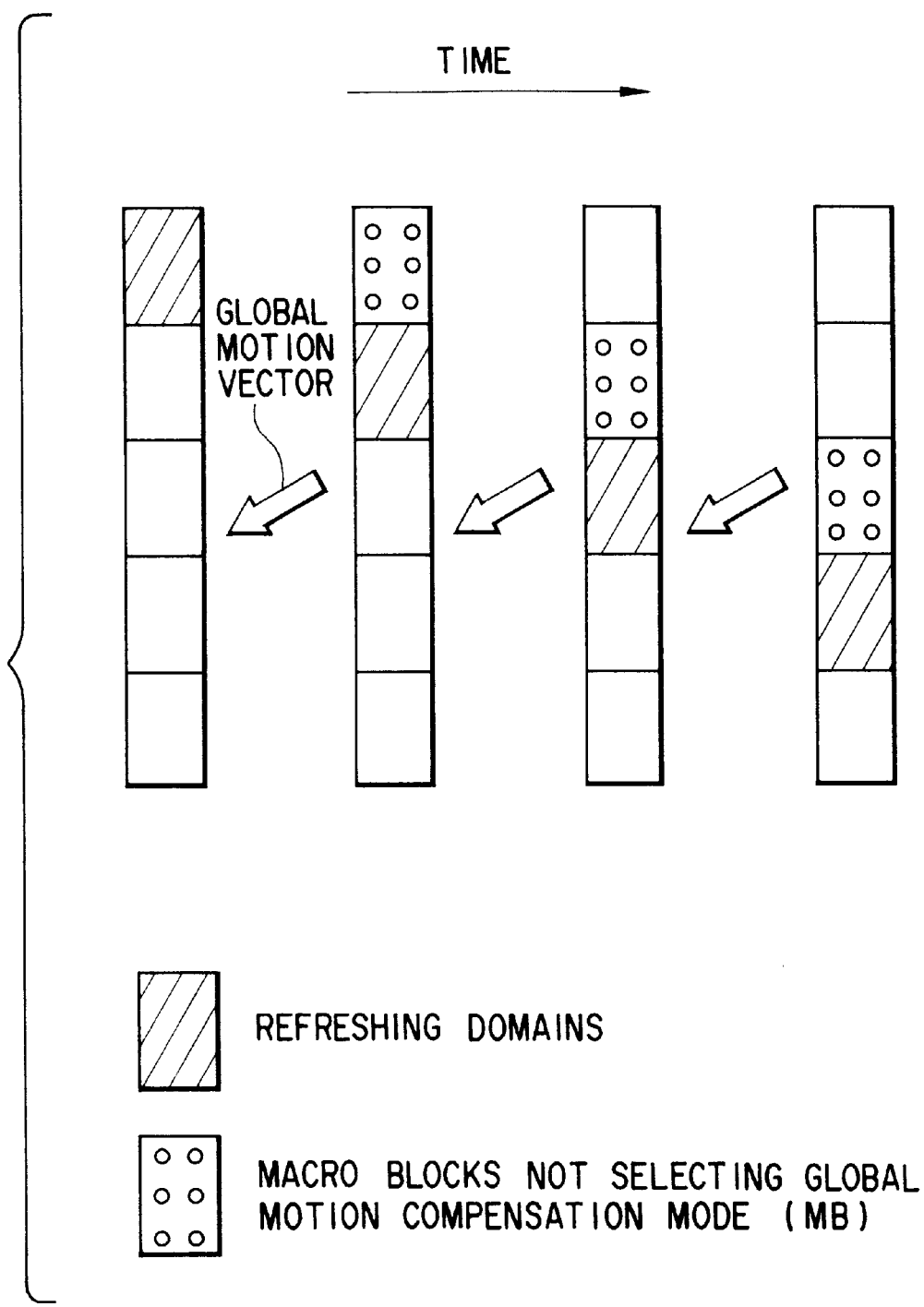
F I G. 17

VIDEO ENCODING AND DECODING APPARATUS

BACKGROUND OF THE INVENTION

1. Field of the Invention

The present invention relates to a video encoding apparatus for compression-encoding a video picture into a small number of bits and, more particularly, to a video encoding apparatus capable of encoding data at an encoding frame rate suitable for the picture quality and decreasing the amount of delay when the encoded data is output.

The present invention also relates to an encoding apparatus for compression-encoding a picture into a small number of bits and a decoding apparatus for reconstructing the picture by decompressing the compression-encoded data and, more particularly, to a video encoding apparatus and a video decoding apparatus which have an intra-encoding mode and an inter-encoding mode and perform refresh by forcedly setting an intra-encoding domain.

2. Description of the Related Art

As a technique of compression-encoding pictures into a small number of bits to transmit or store the pictures in systems for transmitting or storing pictures such as a videophone, a teleconference system, a portable terminal, a digital video disk system, and a digital television broadcast system, various methods such as motion compensation, discrete cosine transform, subband encoding, pyramid encoding, and combinations of these methods have been developed.

In addition, ISO, MPEG1, MPEG2, ITU-T, H. 261, and H. 262 are defined as international standard systems of video compression encoding. All of these systems are compression encoding schemes which combine motion compensation adaptive prediction and discrete cosine transform, and the details are described in, e.g., reference 1 (Hiroshi Yasuda ed., "International Standard of Multimedia Encoding", Maruzen, June 1991).

When a video encoding apparatus using any of these picture compression encoding techniques encodes a video picture at a low bit rate such as 64 kbps or lower, it is difficult to encode the picture at the same frame rate as an input video signal. Therefore, a general approach is to encode an input video signal in units of a few frames to thereby perform encoding at a lowered encoding frame rate. When one frame is completely encoded, the encoded data of the frame is temporarily stored in an output buffer and output to a transmission channel or another system at a predetermined encoded data transmission speed (encoding bit rate).

The setting of the encoding frame rate is crucial because it has a large effect on the encoding quality. If the encoding frame rate is fixed and the frame rate of an input video signal is 30 Hz, discrete values such as 30 Hz, 15 Hz, 10 Hz, 7.5 Hz, 6 Hz, 5 Hz, 4.29 Hz, and 3 Hz are determined as the encoding frame rates in accordance with the number of frames as a unit of encoding. For example, the motion is satisfactory but the picture quality is low when encoding is performed at 10 Hz, and the picture quality is high but the motion is unsatisfactory when encoding is performed at 7.5 Hz. There is another problem that the picture quality abruptly degrades when a scene in which an object is moving at high speed appears.

Accordingly, encoding control which changes the encoding frame rate in accordance with a variation of the picture quality is being developed. One example is a simulation model TMN5 (ITU-T TSS LBC-95 SG15 WP15/1 VIDEO CODEC TEST MODEL, TMN5, January 1995) used in the standardizing work of H. 263 which is a video encoding standard system for PSTN (Public Switched Telephone Network). This simulation model uses an algorithm (TMN algorithm) of variable frame rate/encoding control by which the encoding frame rate changes during encoding. In the TMN algorithm, as the average of quantization parameters QP in the immediately previous frame decreases, a target encoding frame rate in the next frame is increased to decrease the target number of encoding bits (the target number of bits) in the frame.

Conversely, if the average of the quantization parameters QP in the immediately previous frame increases, the encoding frame rate in the next frame is decreased to increase the target number of bits in the frame.

When a compression encoding system like this is applied to video encoding for communication or broadcast, it is desirable that the delay of transmission of encoded data be small in order to allow real-time communication.

Unfortunately, in conventional video encoding apparatuses using an algorithm such as the TMN algorithm which controls the number of encoded bits by changing the encoding frame rate in accordance with variations of the picture quality, the delay of data transmission in an output buffer is not taken into consideration. This poses the problem that a large delay occurs when encoded data is output.

A representative example of the techniques of efficiently compression-encoding video signals is a motion compensation adaptive prediction encoding scheme which encodes (inter-frame-encodes) a prediction error signal which is the difference between an input video signal and a prediction picture signal obtained by performing motion compensation prediction for the input video signal, and transmits the encoded prediction error signal.

When this motion compensation prediction encoding scheme is applied to video encoding for communication or broadcast, it is desirable that the delay of data transmission be small in order to allow real-time communication. Also, the contents of frame memories (storage media) of an encoder and a decoder are made different from each other due to a burst error in a transmission channel. A general method of solving this problem to accomplish real-time communication or broadcast is to refresh a frame by periodically inserting a pixel region for performing intra-frame encoding into the frame, so that the number of encoded bits does not vary from one frame to another.

For example, refresh is performed as follows in the system (ISO-IEC CD13818-2) which was examined in standardization of MPEG2. That is, an intra-frame encoding mode (intra mode) and an inter-frame encoding mode (inter mode) are switched in units of 16 pixels×16 pixels called a macro block. In one frame including 30 vertical macro blocks×44 horizontal macro blocks, two horizontal macro-block lines are encoded in the intra mode, and lines are slid in units of two lines for each frame time to form one cycle with 15 frames. This method is called intra slice. When a certain region is to be encoded in the inter mode in this method, a motion vector searching range is so limited that the search is not performed from another region which has not been refreshed yet. That is, in the intra slice in which the refresh direction is downward, an upward motion vector is the direction related to the limitation. With this limitation, it is ensured that refresh is completed in (two cycles–1) times even in the worst case.

The problem of the refresh is that the number of encoded bits in the intra mode is usually twice the number of encoded bits in the inter mode for the same quantization parameter. To perform encoding at the same rate, therefore, the quantization parameter must be increased by the amount of refresh and this degrades the picture quality.

Also, if a long burst occurs in a transmission channel or a storage medium when a video picture is encoded, coded data of at least several frames cannot be correctly decoded. Consequently, in a video decoder, the decoded picture is largely degraded until refresh is done in the (two cycles−1) frame in the worst case.

Furthermore, if a motion vector is limited when there is a global motion compensation mode in which motion compensation is performed for an entire frame, it is necessary to limit the global motion vector if the vector is in the direction of limitation. This largely degrades the picture quality.

SUMMARY OF THE INVENTION

It is an object of the present invention to provide a video encoding apparatus capable of encoding data at an encoding frame rate suitable for the picture quality and decreasing the amount of delay when the encoded data is output.

It is another object of the present invention to provide a video encoding apparatus and a video decoding apparatus capable of improving the picture quality and suppressing disturbance of the picture quality due to mixing of an error into encoded data without decreasing the effect of refresh.

A video encoding apparatus of the present invention comprises an encoding section for encoding an input picture signal, an output section for temporarily holding the output encoded data from the encoding section and outputting the encoded data at a predetermined transmission rate, and control means for setting the target number of bits of each frame by adjusting the number of bits determined by the transmission rate and a predetermined encoding frame rate so that a delay time when the output section outputs the stored encoded data at the predetermined transmission rate is within a predetermined limit delay time, and, on the basis of this target number of bits, controlling the number of encoded bits generated by the encoding section. With this arrangement, encoding can be performed at an encoding frame rate suitable for the picture quality and the amount of delay when the encoded data is output can be decreased.

Another video encoding apparatus of the present invention comprises an encoding section for quantizing and encoding an input picture signal or an orthogonal transform coefficient obtained by orthogonally transforming a prediction error signal for the input picture signal, an output section for temporarily holding the encoded data output from the encoding section and outputting the encoded data at a predetermined transmission rate, a first control section for setting a target number of bits of each frame by adjusting the number of bits determined by the transmission rate and a predetermined encoding frame rate so that a delay time when the output section outputs the stored encoded data at the predetermined transmission rate is within a predetermined limit delay time, and, on the basis of this target number of bits, controlling a quantization parameter when the encoding section performs quantization, and a second control section for performing control such that the input picture signal to the encoding section is skipped in units of frames until the number of bits of the encoded data held in the output section becomes equal to a value determined by the transmission rate, the limit delay time, and the encoding frame rate. With this arrangement, encoding can be performed at an encoding frame rate suitable for the picture quality and the amount of delay when the encoded data is output can be decreased.

Also, the first control section controls the quantization parameter of the encoding section on the basis of the target number of bits and the picture complexity of the input picture signal. Consequently, encoding can be performed at an encoding frame rate more suitable for the picture quality, and the amount of delay when the encoded data is output can be decreased.

Still another video encoding apparatus of the present invention comprises an encoding section having an intra-encoding mode in which an input video signal is intra-encoded and an inter-encoding mode in which an input video signal is inter-encoded, a selector for adaptively selecting the encoding mode of the encoding section for each predetermined picture domain of the input video signal, and a decision section for deciding a motion domain and a stationary domain in the input video signal on the basis of the input video signal and a video signal in the immediately previous frame. The selector causes the encoding section to perform a refresh operation in which an intra-encoding domain to be encoded in the intra-encoding mode is periodically set in a frame of the input video signal and moved from one frame to another. On the basis of the decision result from the decision section, the period of a refresh operation for the stationary domain is set to be longer than the period of a refresh operation for the motion domain. This decreases the number of macro blocks encoded in the intra mode in the stationary domain when compared to conventional refresh. Consequently, the quantization parameter can be decreased for the same rate, and this improves the picture quality. That is, the picture quality can be improved without decreasing the effect of refresh.

A video decoding apparatus of the present invention comprises an input buffer for temporarily holding encoded data obtained by encoding a video signal in an intra-encoding mode or an inter-encoding mode for each predetermined picture domain, a decoding section for decoding the encoded data temporarily held in the input buffer, a storage section for storing a reference picture signal used when the encoded data is decoded in the inter-encoding mode, and a rewrite section for rewriting the reference picture signal stored in the storage section for each predetermined picture domain on the basis of the video signal obtained by the decoding section by decoding the encoded data in the intra-encoding mode. The rewrite section checks the state of the encoded data for each frame on the basis of the number of bits of the encoded data temporarily held in the input buffer and the number of bits of one frame of the encoded data. If an abnormal frame is detected, the rewrite section stops the rewrite operation of the reference picture based on a video signal of the abnormal frame until a video signal in the intra-encoding mode having a normal frame is obtained by the decoding section. With this arrangement, even if a long burst occurs due to an error occurring in encoded data received from a transmission channel or a storage medium, the influence of the long burst can be decreased. Accordingly, the disturbance of the picture quality caused by mixing of an error into the encoded data can be suppressed without decreasing the effect of refresh, resulting in an improved picture quality.

Still another video encoding apparatus of the present invention comprises an encoding section having an intra-encoding mode in which an input video signal is intra-encoded, a first motion compensation encoding mode in which an input video signal is inter-encoded by performing motion compensation for an entire frame, and a second motion compensation encoding mode in which an input video signal is inter-encoded by performing motion compensation in units of predetermined picture domains obtained by dividing one frame, and a selector for adaptively selecting the encoding mode of the encoding section for each predetermined picture domain of the input video signal. The selector causes the encoding section to perform a refresh operation in which an intra-encoding domain to be encoded in the intra-encoding mode is periodically set in a frame of the input video signal and moved from one frame to another. Also, when the encoding section inter-encodes the input video signal, the selector does not select the first motion compensation encoding mode for a picture domain in which a motion vector for the refresh operation must be limited. With this arrangement, the influence of the limitation on the motion vector during refresh does not spread over an entire frame but can be suppressed within a predetermined picture domain in the frame. Accordingly, the disturbance of the picture quality caused by mixing of an error into the encoded data can be suppressed without decreasing the effect of refresh, resulting in an improved picture quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a flow chart for explaining processing performed by the encoding control circuit for one frame;

FIG. 5 is a flow chart for explaining processing of determining an encoding frame rate;

FIG. 14 is a flow chart for explaining another operation of the refresh decision circuit, which illustrates a case where refresh is performed by an intra-column;

FIG. 17 is a view for explaining the operation of a mode selector; and

DETAILED DESCRIPTION OF THE PREFERRED EMBODIMENTS

A video encoding apparatus according to one embodiment of the present invention will be described below with reference to FIG. 1.

Figure 1:
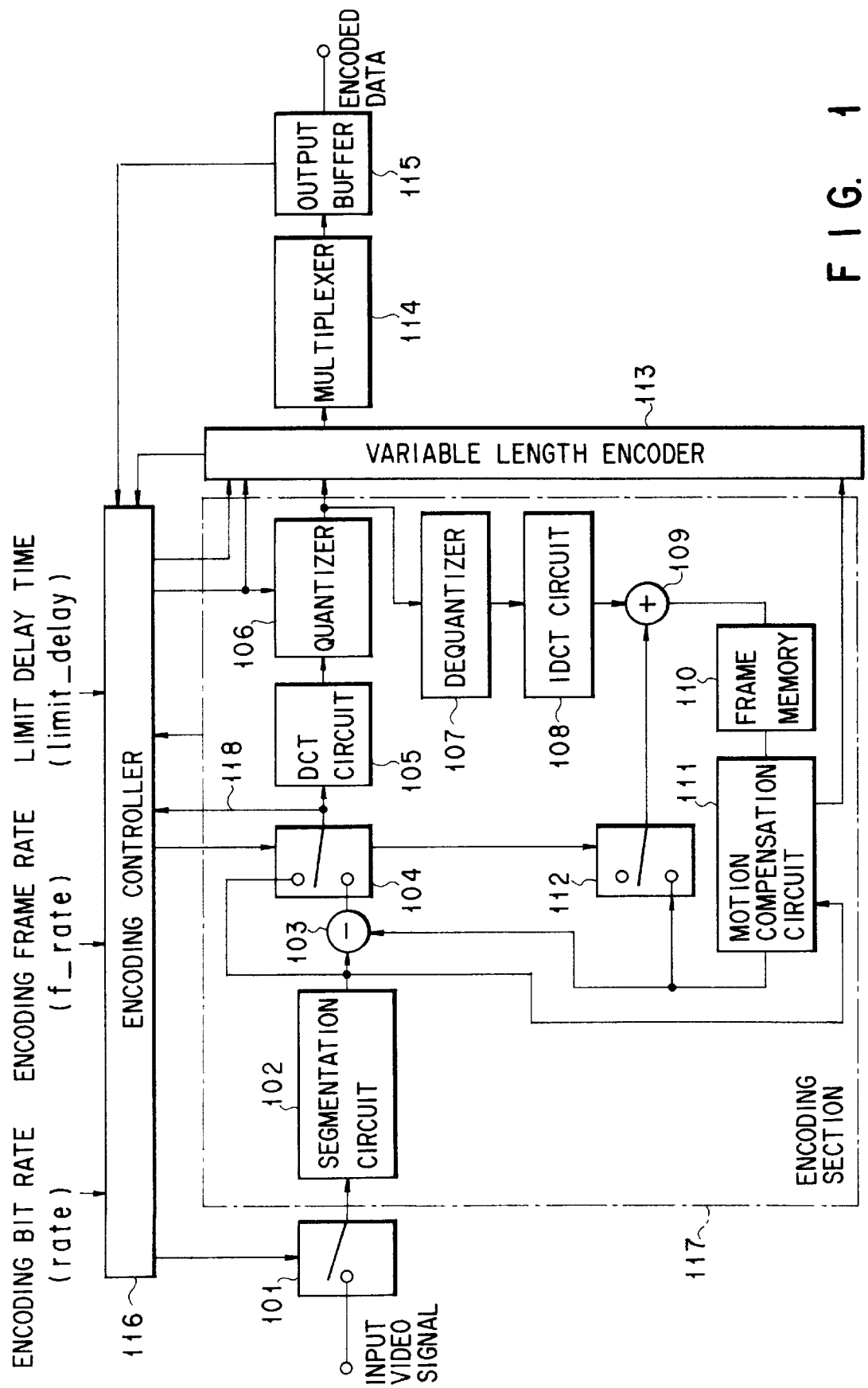
FIG. 1 is a block diagram of a video encoding apparatus according to one embodiment of the present invention.

Referring to FIG. 1, an input video signal to an encoder 117 is input to a switch 101. Under the control of an encoding control circuit 116, an input video signal of a frame to be encoded is selected by the switch 101 and segmented into macro blocks by a block segmenting circuit 102. The input video signal segmented into macro blocks is input to a subtracter 103. The subtracter 103 calculates the difference between the input picture signal and a prediction picture signal which is formed as will be described later and generates a prediction error signal. A mode selection switch 104 selects one of the prediction error signal and the input video signal from the block segmenting circuit 102. A DCT (Discrete Cosine Transform) circuit 105 performs discrete cosine transform for the selected signal. The DCT coefficient data obtained by the DCT circuit 105 is quantized by a quantizer 106. The signal quantized by the quantizer 106 is divided into two signals. One signal is variable-length-encoded by a variable-length encoder 113. The other signal is supplied to a dequantizer 107 and an IDCT (Inverse Discrete Cosine Transform) circuit 108 where the signal is subjected to processing which is reverse to the processing done by the quantizer 106 and the DCT circuit 105. An adder 109 adds the processed signal to an input prediction picture signal from a switch 112, thereby generating a local decoded signal. This local decoded signal is stored in a frame memory 110 and input to a motion compensation circuit 111 to generate a prediction picture signal.

The encoding control circuit 116 controls the encoder 117 on the basis of encoded data from the encoder 117, the number of encoded bits (the number of coded bits) from the variable-length encoder 113, and a buffer capacity from an output buffer 115, and supplies necessary data to the variable-length encoder 113. The data encoded by the variable-length encoder 113 are multiplexed by a multiplexer 114, smoothed at a fixed output rate (encoding bit rate) by the output buffer 115, and transmitted as encoded data.

The encoding control circuit 116 receives a signal which informs an encoding bit rate (rate (bits/sec)) of the output encoded data from the output buffer 115, a signal which informs an encoding frame rate (f_rate (Hz)), and a signal which informs a delay time permitted for the output encoded data from the output buffer 115, i.e., a limit delay time (limit_delay (msec)). On the basis of information which is preset by these signals, the encoding control circuit 116 controls the number of encoded bits generated by the encoder 117 so that the delay time of the output encoded data from the output buffer 115 is within the limit delay time (limit_delay (msec)).

Figure 2:
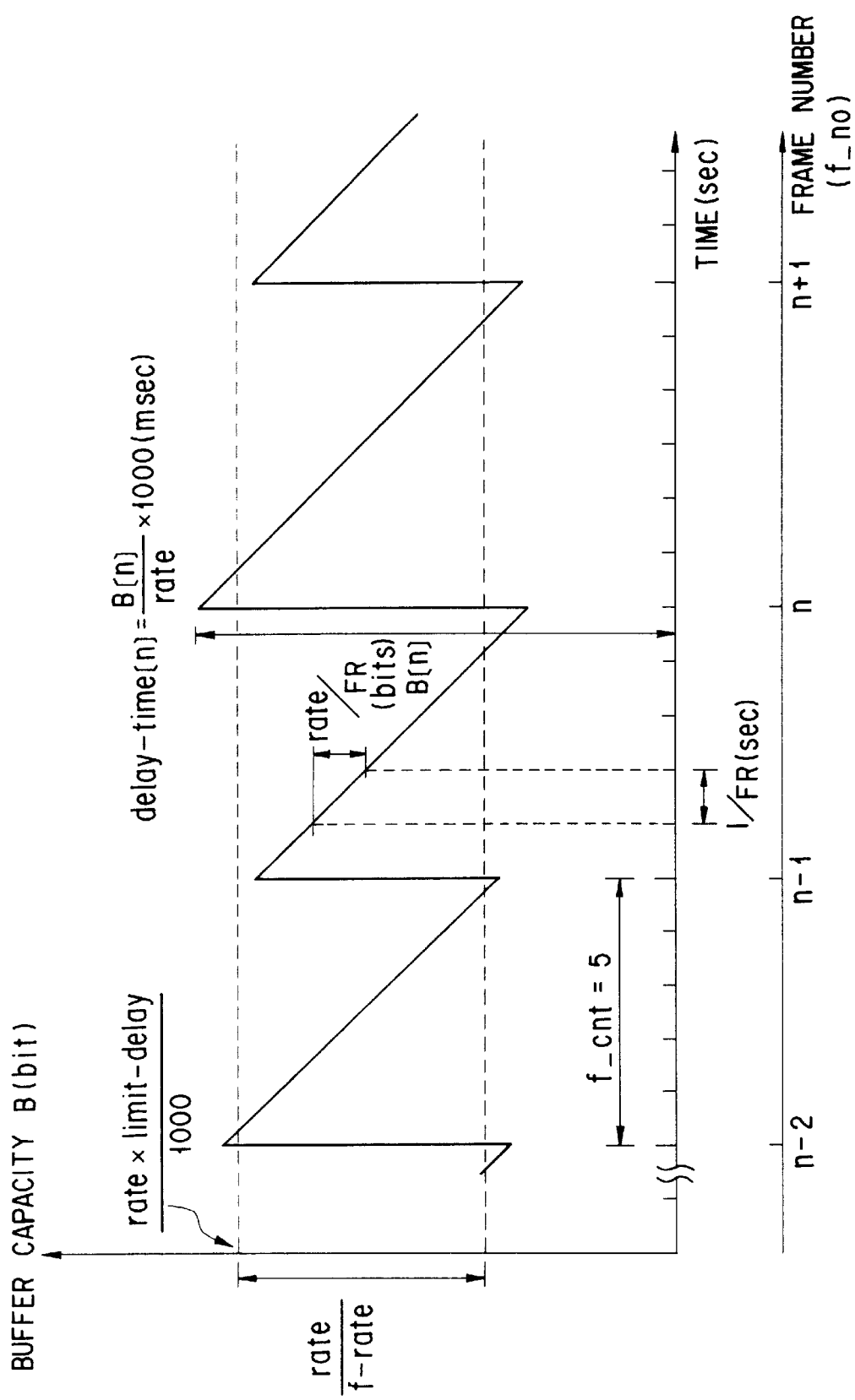
FIG. 2 is a graph for explaining the principle of processing of an encoding control circuit.

The principle of the present invention will be described below with reference to FIG. 2. In FIG. 2, it is assumed that when encoding of one frame is completed, the encoded data of the frame is entirely input to the output buffer 115, and the encoded data is output from the output buffer in accordance with the encoding bit rate (bits/sec).

An average delay time ave_delay (msec) depends upon a buffer capacity B of the output buffer 115. The delay time (delay_time (msec)) in a frame of a frame number (f_no) n is obtained by dividing a peak buffer capacity B[n] when the frame of the frame number n is completely encoded by the encoding bit rate (rate) and multiplying the quotient by 1000. The average delay time ave_delay is the average of the delay times thus calculated up to the point.

In this embodiment, the basic control is to calculate the target number of bits (target) of each frame to be encoded and, on the basis of this target number of bits (target), change the quantization parameter and the encoding frame rate, i.e., the number of frames to be skipped, thereby holding the delay time constant.

Assume that an initial value of the target number of bits (target) of each frame is obtained by dividing the encoding bit rate (rate) by the set encoding frame rate f_rate. The set frame rate f_rate need not be a value obtained by dividing a frame rate FR of an input video signal by a natural number. Accordingly, the set encoding frame rate f_rate does not take a discrete value unlike in the case of a fixed encoding frame rate, and this increases the degree of freedom. As an example, a value such as 7.25 (Hz) can be set as f_rate. To ensure the setting of the delay time, however, if the average delay time ave_delay up to the point exceeds the set value limit_delay, the target number of bits (target) of each frame is decreased by the exceeded amount.

A method of determining a frame to be encoded next is done as follows. That is, encoded data is supplied until the buffer capacity B is equal to or smaller than an amount obtained by subtracting the default target number of bits rate/frame (bits) from a buffer capacity rate*limit_delay/1000 (bits) corresponding to the preset encoding bit rate and limit delay time. Assume that a value indicating a frame to be encoded next is represented by f_cnt. When control is performed in this way, the delay time delay_time does not exceed the set value limit_delay if the number of encoded bits in the next frame is decreased to be less than the target number of bits.

If the actual number of encoded bits largely exceeds the target number of bits (target), f_cnt increases and a larger number of input frames are skipped. This decreases the encoding frame rate. Conversely, if the number of encoded bits is much smaller than the target number of bits, f_cnt decreases and a smaller number of frames than usual are skipped. This increases the encoding frame rate.

As described above, the number of encoded bits is limited by setting the target number of bits (target) of each frame and, on the basis of the resulting number of encoded bits, a frame to be encoded next is decided. Consequently, an encoding frame rate suitable for the picture quality is realized, and the average delay time of the output encoded data from the output buffer 115 can be decreased to be less than the set limit delay time.

FIG. 3 is a flow chart for explaining the control processing performed by the encoding control circuit 116 for each frame when encoding is performed in units of frames in the video encoding apparatus shown in FIG. 1.

First, before encoding of each frame, the target number of bits (target) of each frame is set (step S101). On the basis of this "target", a reference quantization parameter b_QP of each frame used when the quantizer 106 performs quantization is set (step S102).

Subsequently, before encoding is performed for each macro frame, the quantization parameter QP is calculated (step S103). Encoding is performed by controlling the quantizer 106 on the basis of the calculated value (step S104). This quantization parameter QP is a quantization parameter in intra-frame encoding.

When the encoding of one frame is completed, the number f_cnt of frames to be skipped without being encoded is calculated by processing to be described later, and a frame to be encoded next is decided (step S105). The input video signal switch 101 is so controlled as to skip (thin) the number f_cnt of frames.

The processing of setting the target number of bits (target) of each frame performed in step S101 of FIG. 3 will be described in detail below with reference to a flow chart in FIG. 4.

For the first frame (frame number f_no=1), the target number of bits (target) of each frame is set to the preset encoding bit rate (rate) as an initial value (steps S201 and S202). For each of the second and the subsequent frames (frame number f_no=2 or more), the target number of bits (target) is first set to a value obtained by dividing the set encoding bit rate (rate) by the set encoding frame rate f_rate (step S203). However, if the average delay time ave_delay of encoded data of frames up to the previous frame exceeds the set delay time limit_delay (step S204), the number of bits corresponding to the exceeded amount is subtracted from "target" (step S205).

Also, if the set value of "target" is smaller than the value obtained by dividing the set value "rate" by the frame rate FR of the input video signal (step S206), the control may break down. If this is the case, therefore, rate/FR is set as "target" by giving the priority to the number of bits rather than the delay amount (step S207).

The reference quantization parameter b_QP of each frame in step S102 of FIG. 3 will be described below. The reference quantization parameter b_QP is calculated by equation (1) below.

$$b\_QP = pre\_QP * \left(1 + \alpha * \frac{pre\_frame\_bits - target}{rate / f\_rate}\right) \quad (1)$$

Note that b_QP is limited to 1 to 31.

In equation (1), pre_QP is an average quantization parameter in the immediately previous frame, pre_frame_bits is the number of bits in the immediately previous frame, and $\alpha$ is a reaction parameter of the first quantization parameter.

In addition to the above method, the reference quantization parameter b_QP can be calculated as follows. That is, a standard deviation sgm of a motion compensation prediction error signal (a signal 118 in FIG. 1) of one frame is previously calculated, and the reference quantization parameter b_QP is decided from this standard deviation sgm and the target number of bits (target). This standard deviation is calculated by subtracting an average value in each small region (e.g., an 8×8 block). b_QP can be calculated by equation (2) below.

$$b\_QP = a*(sgm \cdot b)/target \quad (2)$$

where a and b are constants, e.g., a=0.25 and b=1.5.

The quantization parameter QP in step S103 of FIG. 3 will be described below. The quantization parameter QP can be calculated by equation (3) below. Note that although the quantization parameter QP can be calculated for each macro block, QP is calculated for each macro-block line in this embodiment.

$$QP = b\_QP * \left(1 + \beta * \frac{\sum_{i=1}^{mb-1}(encoded\_bit[i] - i*target/MB)}{rate/f\_rate}\right) \quad (3)$$

Note that QP is limited to 1 to 31.

In equation (3), mb is the current number (1 to MB) of macro blocks, MB is the number of macro blocks per frame, β is a reaction parameter of the second quantization parameter, and an array encoded_bits is the number of encoded bits in each macro block.

The processing of determining an encoding frame in step S105 of FIG. 3 will be described below with reference to a flow chart in FIG. 5.

In FIG. 5, f_cnt indicates a frame to be encoded next, i.e., the number of frames to be skipped without being encoded.

First, the variable-length encoder 113 informs the number of bits generated in a frame, and the amount is added to the buffer capacity B of the output buffer 115 at that time (step S301).

A method of deciding the value f_cnt indicating a frame to be encoded next is as follows. First, initialization is performed by setting the value of f_cnt to "0" (step S302). A value obtained by dividing the set encoding bit rate (rate) by the frame rate FR of an input video signal, i.e., the number of bits corresponding to the transmission rate at the frame rate FR of the input video signal is subtracted from the buffer capacity B (step S303). f_cnt is increased until the buffer capacity B is equal or smaller than a value obtained by subtracting the default number of bits (rate/f_rate) of each frame from the number of bits (rate×limit_delay/1000) corresponding to the set limit delay time (limit_delay) (step S304). Consequently, the number f_cnt of frames to be skipped without being encoded is calculated.

Another control processing that the encoding control circuit 116 performs for each frame when performing encoding will be described below with reference to a flow chart in FIG. 6.

This encoding control method is characterized in that the target number of bits in each macro block is set by calculating the activity of the prediction error signal 118 selected by the switch 109 before encoding is performed, thereby performing encoding control more suitable for the picture quality. The activity of the prediction error signal 118 is picture status information which represents the complexity of a picture to be encoded for each macro block. For example, as the value of the activity increases, it becomes necessary to increase the number of bits.

First, the target number of bits (target) of each frame is set before encoding is performed in units of frames (step S401). In addition, the target number of bits target_mb of each macro block is set (step S402). Also, the reference quantization value b_QP of each frame is set (step S403).

Subsequently, before each macro block is encoded, the quantization parameter QP is calculated (step S404). Encoding is performed on the basis of the calculated value (step S405).

When one frame is completely encoded, the number f_cnt of frames to be skipped without being encoded is calculated to decide a frame to be encoded next (step S406).

Figure 4:
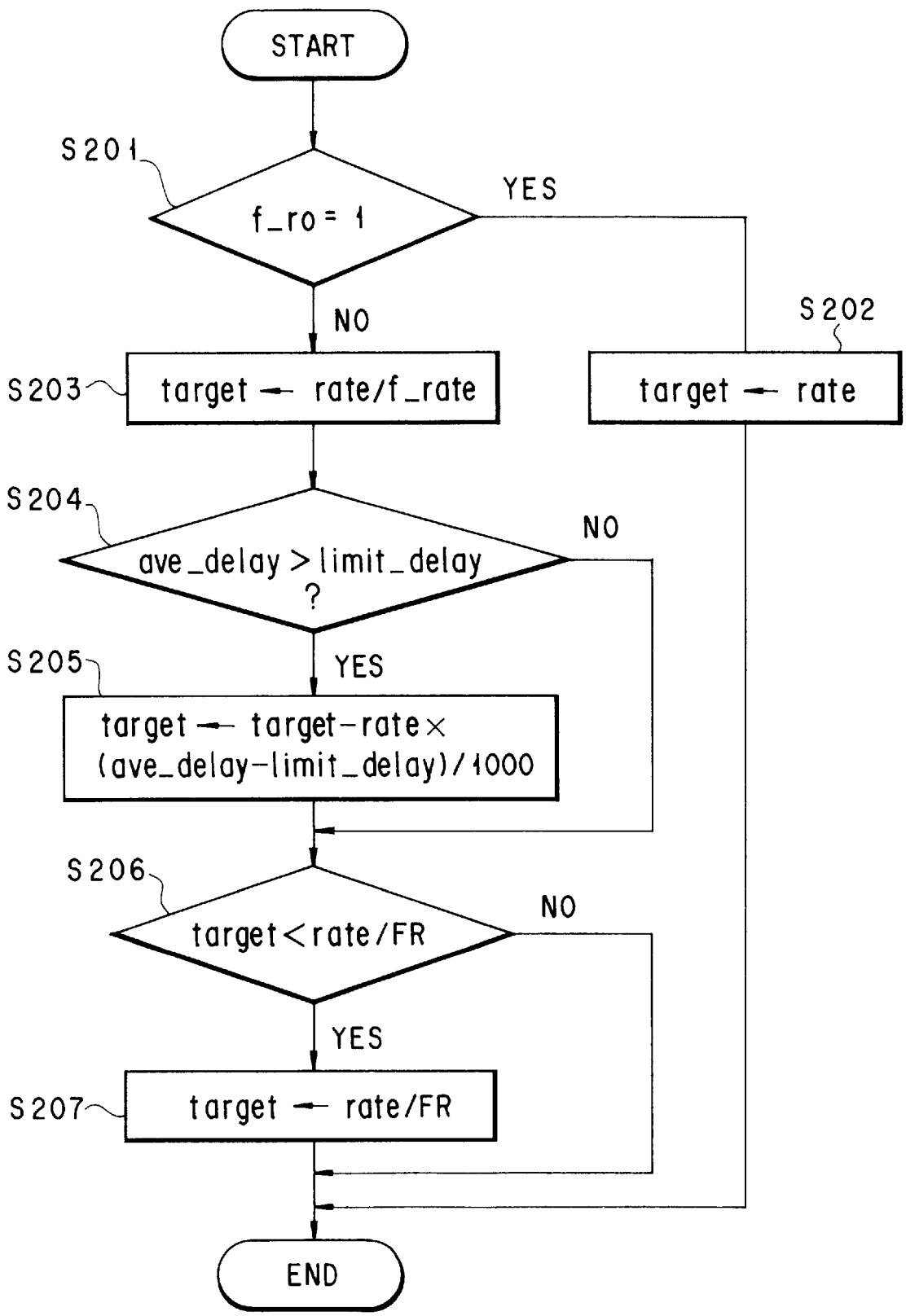
FIG. 4 is a flow chart for explaining processing of setting the target number of bits of each frame.
Figure 6:
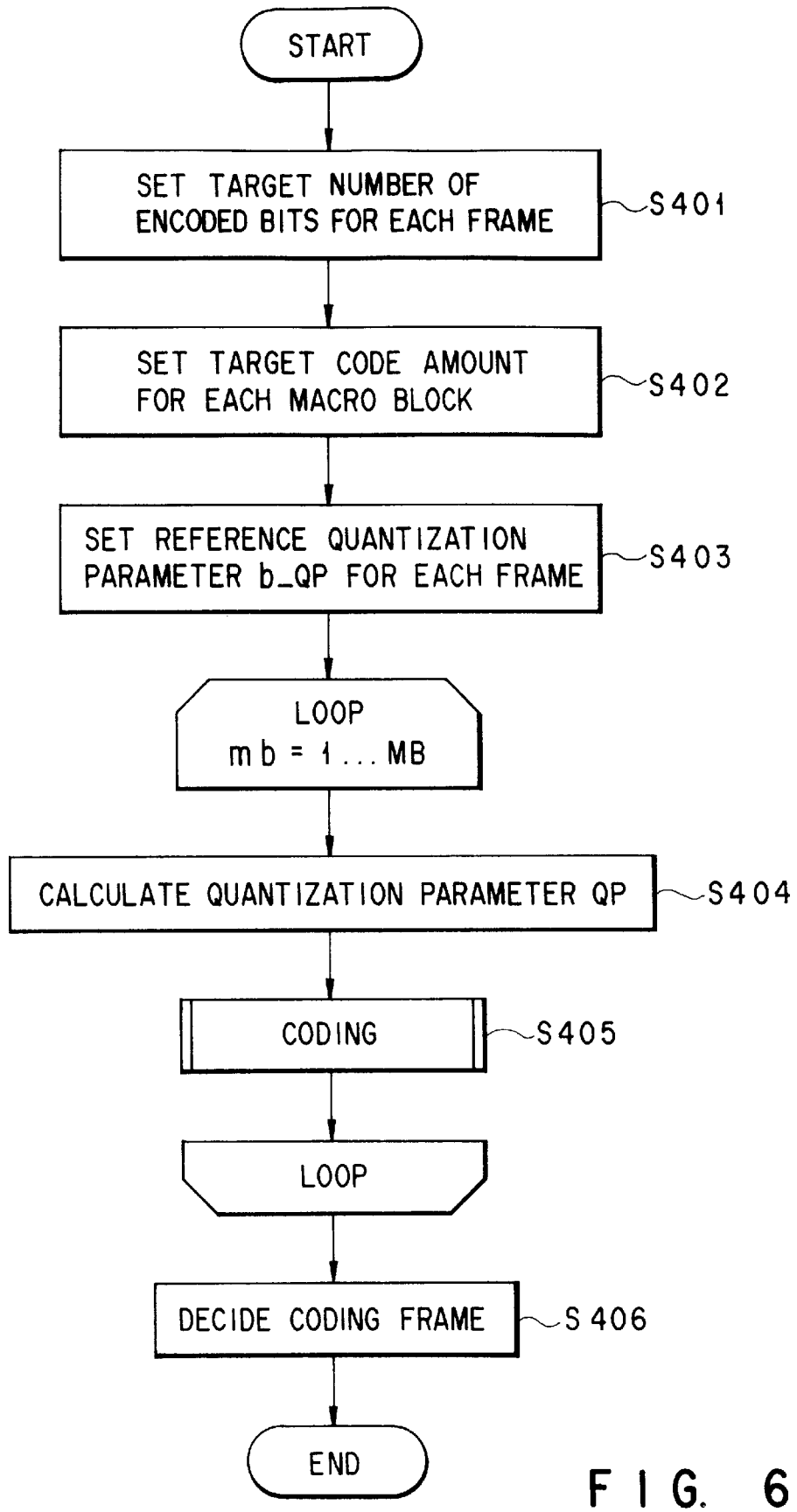
FIG. 6 is a flow chart for explaining another processing performed by the encoding control circuit for one frame.

The processing of setting the target number of bits (target) of each frame performed in step S401 of FIG. 6 is analogous to that shown in FIG. 4.

The target number of bits target_mb of each macro block in step S402 of FIG. 6 can be calculated by equations (4) to (9) for each macro block mode. First, the activity of an intra-frame encoded macro block (to be referred to as an intra macro block hereinafter) is calculated in accordance with equations (4) and (5).

Figure 7:
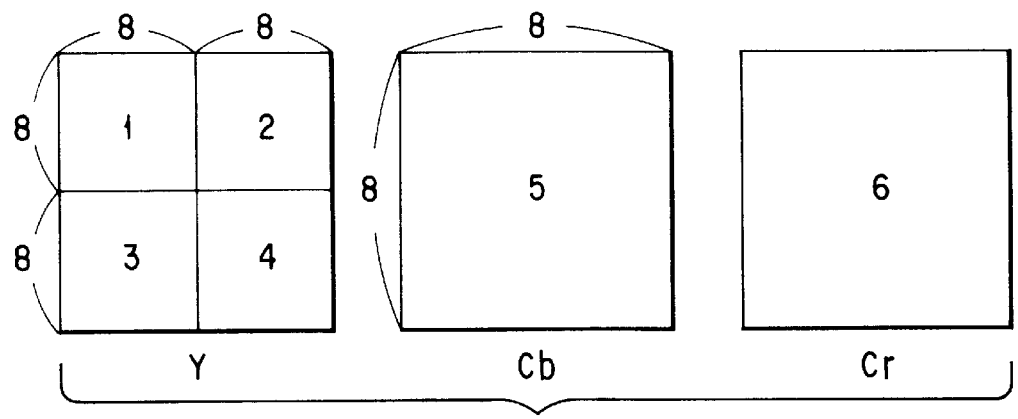
FIG. 7 is a view for explaining the format of a macro block.

Each macro block has a format generally used in, e.g., H. 261, MPEG1, and H. 263 as shown in FIG. 7. That is, a macro block contains six blocks, i.e., consists of a luminance signal (Y) containing four blocks of 8×8 pixels and chrominance signals (Cb and Cr) each of which is a block of 8×8 pixels.

Note that original_picture indicates an input video signal in each macro block, and dc is an average value of macro blocks of the input video signal calculated by equation (5).

$$MB\_activity[mb] = \quad (4)$$

$$48 + \sum_{block=1}^{6} \log2\left(\sum_{i=1}^{8}\sum_{j=1}^{8} abs(original\_picture - dc)\right)$$

$$dc = 9\left(\sum_{i=1}^{8}\sum_{j=1}^{8} original\_picture\right)/64 \quad (5)$$

As a consequence, the target number of bits target_mb of each intra macro block is calculated by equation (6) below.

$$target\_mb = \quad (6)$$

$$\frac{(target - not\_coded)*comp*intra}{intra*comp = inter} * \frac{MB\_activity[mb]}{\sum^{intra} MB\_activity}$$

(6) where intra is the number of intra macro blocks in a frame, inter is the number of inter macro blocks in the frame, and not_coded is the number of non-encoded macro blocks in the frame.

In an inter-frame encoded macro block (to be referred to as an inter macro block hereinafter), the activity is calculated in accordance with equation (7). The target number of bits target mb in each macro block is calculated by equation (8).

Note that pred_picture is a prediction picture signal formed by the motion compensation circuit 111 for each macro block.

$$MB\_activity[mb] = \quad (7)$$

$$\sum_{block=1}^{6} \log2\left(\sum_{i=1}^{8}\sum_{j=1}^{8} abs(original\_picture - pred\_picture)\right)$$

$$target\_mb[mb] = \frac{(target - not\_coded)*inter}{intra*comp + ubter} * \frac{MB\_activity[mb]}{\sum^{inter} MB\_activity} \quad (8)$$

Note that an activity ratio comp is calculated in accordance with equation (9) from data encoded in the immediately previous frame.

$$comp = \frac{\left(\sum^{intra} encoded\_bits*QP/MB\_activity\right)/intra}{\left(\sum^{intra} encoded\_bits*QP/MB\_activity\right)/inter} \quad (9)$$

(9) where encoded_bit is the number of encoded bits in each macro block and QP is the value of a quantization parameter in each macro block.

The reference quantization parameter b_QP of each frame in step S403 of FIG. 6 is calculated by equations (10) and (11) while the activity of a frame is taken into account.

$$frame\_act = \left(\sum_{i=1}^{MB} MB\_activity[i]\right) / MB \quad (10)$$

$$b\_QP = pre\_QP * \quad (11)$$
$$\left(1 + \alpha * \frac{frane\_act / pre\_frame\_act * frame\_bits - target}{rate / f\_rate}\right)$$

Note that b_QP is limited to 1 to 31.

In equation (10) and (11), frame_act is the activity of the current frame, pre_QP is the average quantization parameter of the immediately previous frame, pre_frame_bits is the number of bits of the immediately previous frame, pre_frame_act is the activity of the immediately previous frame, and α is a reaction parameter of the first quantization parameter.

The quantization parameter QP in step S409 of FIG. 6 is calculated by equation (12). Although the quantization parameter QP can be calculated for each macro block, QP is calculated for each macro block line in this embodiment.

$$QP = b\_QP * \left(1 + \beta * \frac{\sum_{i=1}^{mb-1} (encoded\_bits[i] - target\_mb[i])}{rate / f\_rate}\right) \quad (12)$$

Note that QP is limited to 1 to 31.

In equation (12), mb is the current number (1 to MB) of macro blocks, MB is the number of macro blocks per frame, β is a reaction parameter of the second quantization parameter, and an array encoded_bits is the number of encoded bits in each macro block.

The processing of determining the encoding frame in step S406 of FIG. 6 determines f_cnt as in FIG. 5.

In this embodiment, encoding is performed in units of frames. However, it is of course possible to practice the present invention when encoding is performed in units of fields.

Figure 8:
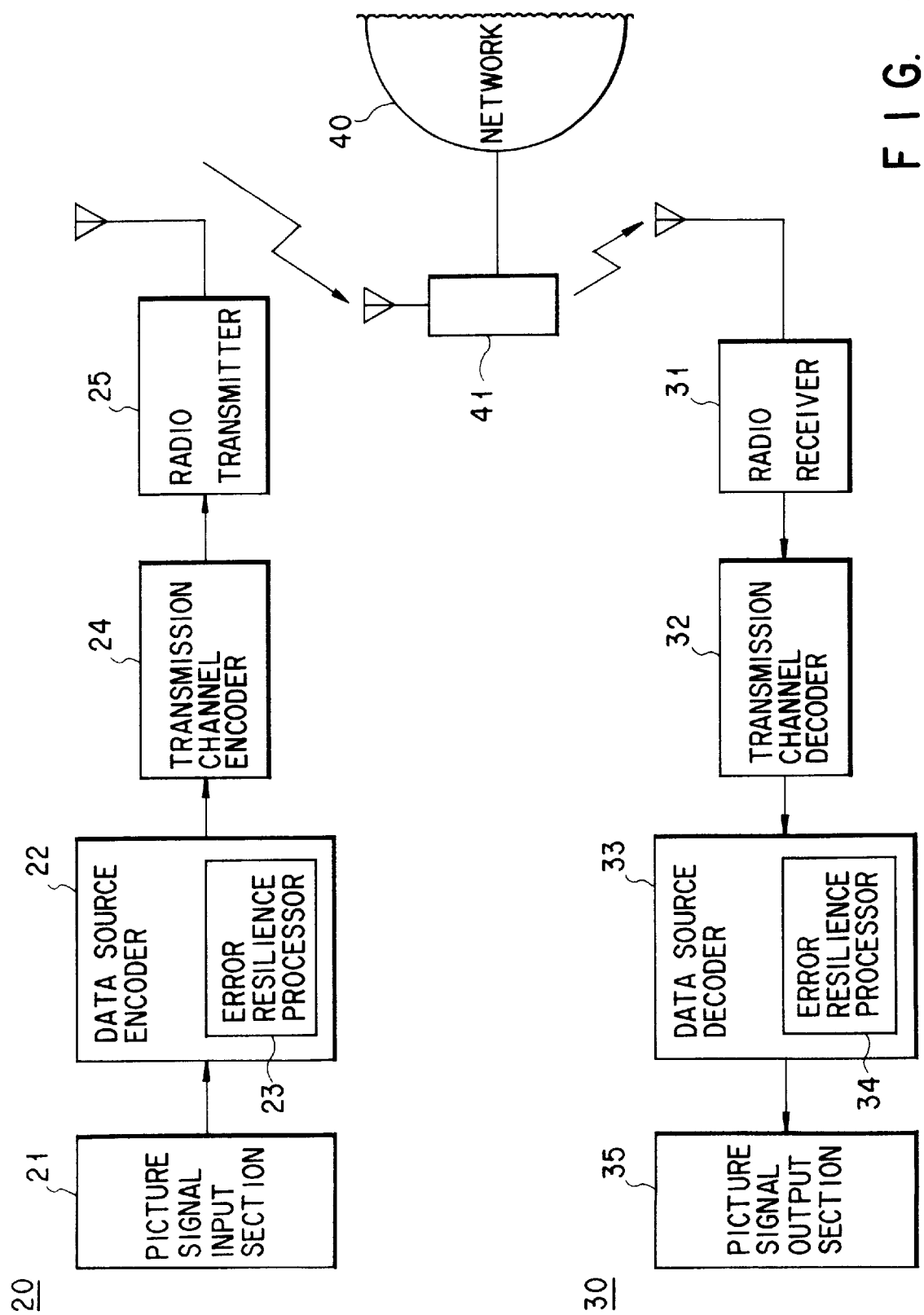
FIG. 8 is a block diagram of a radio communication system according to the second embodiment of the present invention, in which the video encoding apparatus of the present invention is applied.

FIG. 8 shows the second embodiment in which the video encoding apparatus of the present invention is applied to a radio communication system.

Referring to FIG. 8, the radio communication system includes a picture transmission apparatus 20 and a picture reconstruction apparatus 30 and transmits and receives pictures via a base station 41 provided with a network 40.

The picture transmission apparatus 20 comprises a picture signal input section 21, a data source encoding section 22 including an error resilience processor 23, a transmission channel encoding section 24, and a radio transmitter 25. The data source encoding section 22 performs discrete cosine transform (DCT) and quantization. The transmission channel encoding section 24 performs error detection and correction for encoded data.

The video encoding apparatus according to the present invention is applied to the main part of the data source encoding section 22. The picture reconstruction apparatus 30 comprises a radio receiver 31, a transmission channel decoding section 32, a source decoding section 33 including an error resilience processor 34, and a picture signal output section 35.

Figure 9:
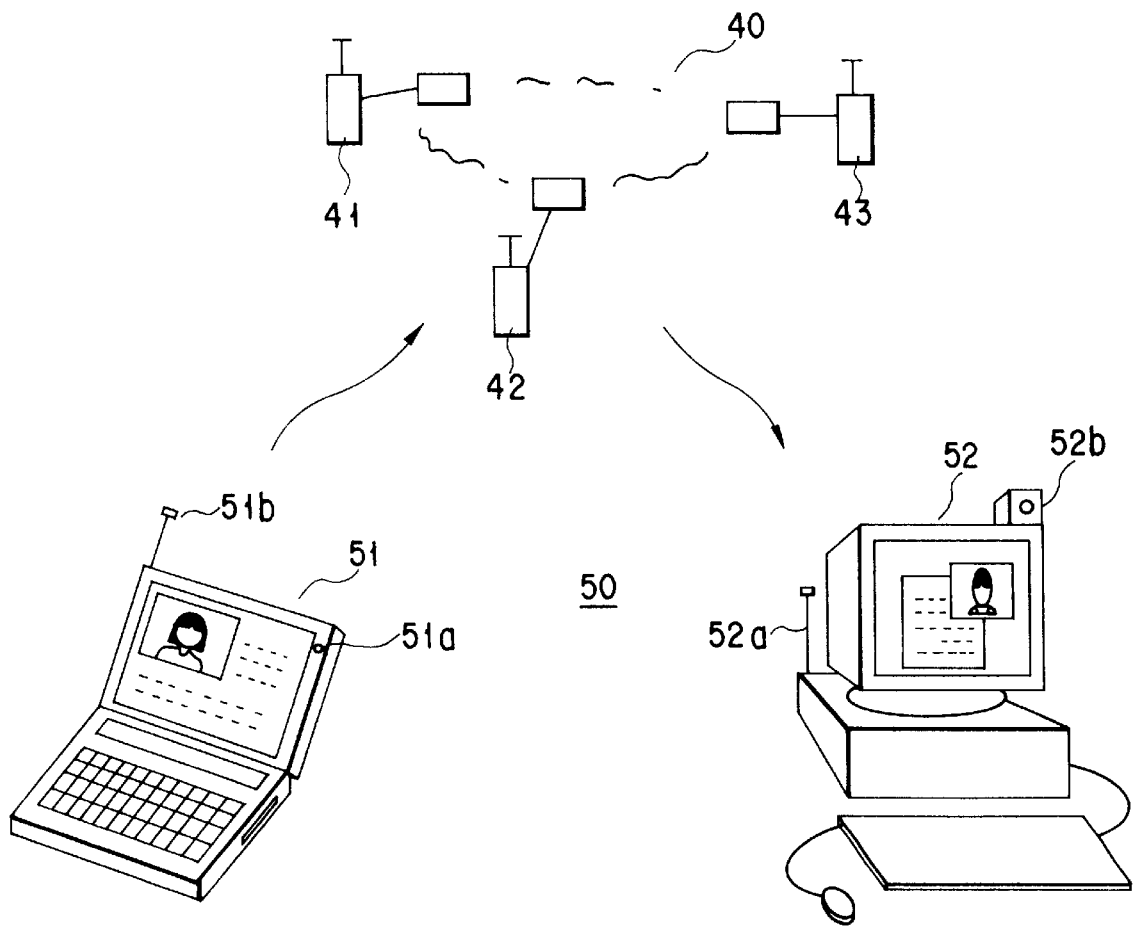
FIG. 9 is a view showing an example of the radio communication system according to the second embodiment.

FIG. 9 shows one example of the radio communication system according to the second embodiment. As shown in FIG. 9, video pictures are transmitted and received by terminals 50 such as a laptop type personal computer 51 and a desktop type personal computer 52 via base stations 41, 42, and 43 of the communication network 40.

For example, an input picture signal from a camera 51a attached to the personal computer 51 as a picture signal input section is encoded by the data source encoding section 22 incorporated into the personal computer 51. The encoded data output from the data source encoding section 22 is multiplexed with other information such as speech and data, and the multiplexed information is radio-transmitted via the radio transmitter 25 and an antenna 51b of the personal computer 51. The radio signal is transmitted via the base stations 41 to 43 provided in the network 40 and received via an antenna 52a of the personal computer 52 and the radio receiver 31 incorporated into the personal computer 52. The signal received by the radio receiver 31 is demultiplexed into the encoded data of the picture signal and the speech data. The encoded data of the picture signal is decoded by the source decoding section 33 of the personal computer 52 and displayed on the display of the personal computer 52.

Meanwhile, an input picture signal from a camera 52b attached to the personal computer 52 as the picture signal input section 21 is encoded in the same manner as above by the data source encoding section 22 incorporated into the personal computer 52. The encoded data is multiplexed with other information such as speech and data, and the multiplexed data is radio-transmitted from the radio transmitter 25 and the antenna 52a of the personal computer 52. The radio signal is transmitted via the base stations 41 to 43 provided in the network 40 and received via the antenna 51a of the personal computer 51 and the radio receiver 31 incorporated into the personal computer 51. The signal received by the radio receiver 31 is demultiplexed into the encoded data of the picture signal and the information of speech and data. The encoded data of the picture signal is decoded by the source decoding section 33 of the personal computer 51 and displayed on the display of the personal computer 51.

In the above embodiment as described above, the encoding control circuit 116 adjusts the number of bits (rate/f_rate) which is decided by the encoding bit rate (rate) and the encoding frame rate (f_rate), such that the delay time when the output buffer 115 outputs the stored encoded data at the predetermined encoding bit rate (rate) is within the predetermined limit delay time (limit_delay), thereby setting the target number of bits (target) of each frame. On the basis of this target number of bits (target), the encoding controller 116 controls the quantizer 106 of the encoder 117 and the switch 101 (more specifically, calculates the quantization step parameter and the number f_cnt of frames to be skipped without being encoded). Consequently, encoding can be performed at an encoding frame rate suitable for the picture quality and the amount of delay when the encoded data is output can be decreased.

Also, on the basis of the prediction error signal 118, the activity representing the picture complexity of an input video signal is calculated for each macro block. The quantization parameter is calculated by also taking account of the calculated activity. Consequently, encoding control more suitable for the picture quality can be performed.

A video encoding apparatus according to the third embodiment will be described below with reference to FIG. 10.

Figure 10:
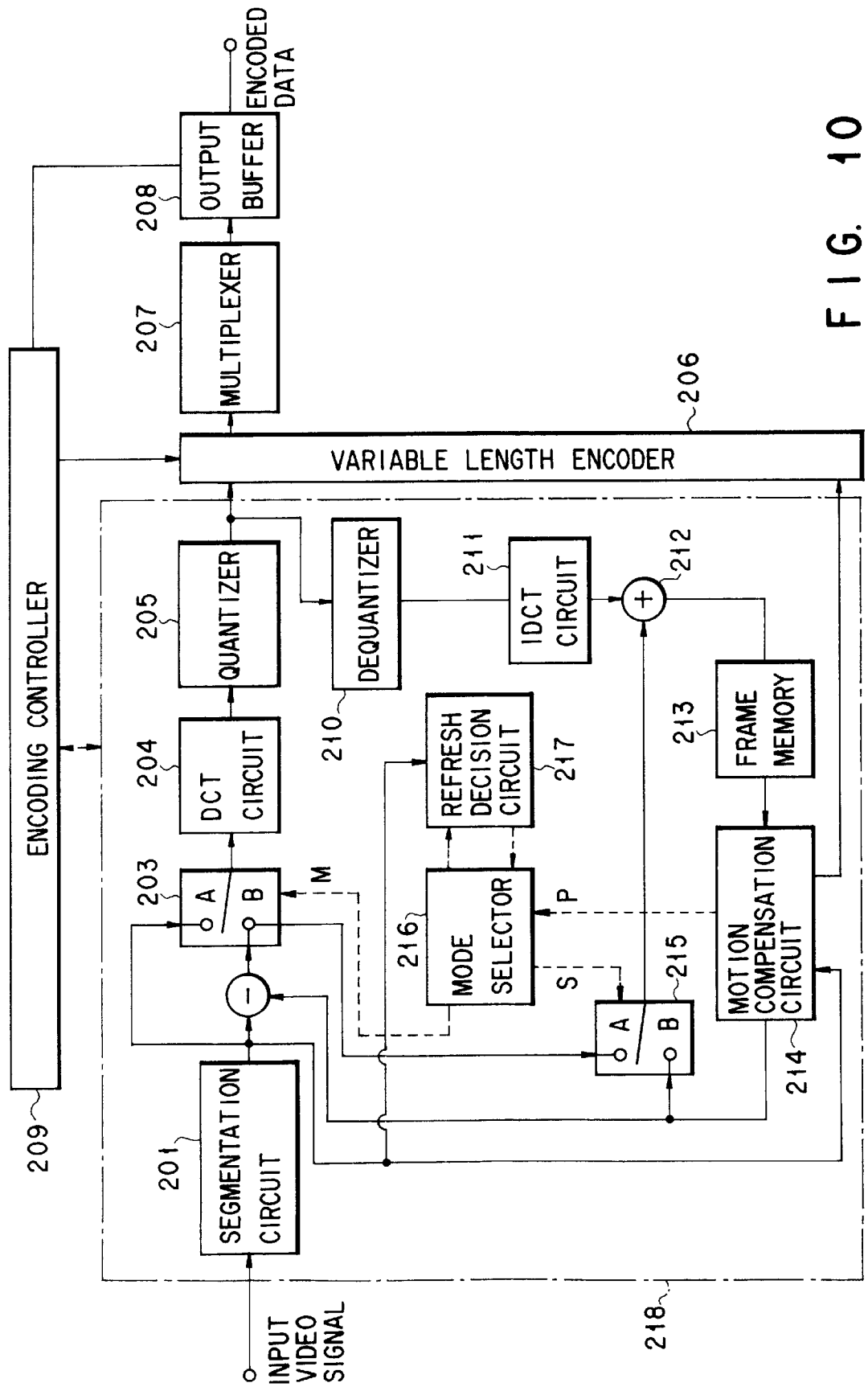
FIG. 10 is a block diagram of a video encoding apparatus according to the third embodiment of the present invention.

In FIG. 10, an input video signal is segmented into macro blocks by a block segmenting circuit 201. The input video signal segmented into macro blocks is input to a subtracter 202. The subtracter 202 calculates the difference between the input video signal and a prediction picture signal and generates a prediction error signal. A mode selection switch 203 selects one of the prediction error signal and the input video signal from the block segmenting circuit 201. A DCT (Discrete Cosine Transform) circuit 204 performs discrete cosine transform for the selected signal. The DCT coefficient data obtained by the DCT circuit 204 is quantized by a quantizer 205. The signal quantized by the quantizer 205 is divided into two signals. One signal is variable-length-encoded by a variable-length encoder 206. The other signal is supplied to a dequantizer 210 and an IDCT (Inverse Discrete Cosine Transform) circuit 211 where the signal is subjected to processing which is reverse to the processing performed by the quantizer 205 and the DCT circuit 204. An adder 212 adds the processed signal to an input prediction picture signal from a switch 215, thereby generating a local decoded signal. This local decoded signal is stored in a frame memory 213 and input to a motion compensation circuit 214.

As shown in FIG. 20, the motion compensation circuit 214 inhibits an unrefreshed domain 2 from performing motion compensation for an already refreshed intra domain 1, thereby forming a prediction picture signal.

An encoding control circuit 209 controls encoding on the basis of encoded information from an encoder 218 and a buffer capacity from an output buffer 208 and supplies necessary data to the variable-length encoder 206. The data encoded by the variable-length encoder 206 is multiplexed by a multiplexer 207, the transmission rate of the multiplexed data is smoothed by the output buffer 208, and the data is transmitted as encoded data.

On the basis of prediction information P from the motion compensation circuit 214, a mode selector 216 selects a macro block to be subjected to inter-frame encoding and a macro block to be subjected to intra-frame encoding in units of macro blocks.

To perform intra-frame encoding (intra encoding), mode selection switch information M serves as A and switch information S serves as A. To perform inter-frame encoding (inter encoding), the mode selection switch information M serves as B and the switch information S serves as B. The mode selection switch 203 performs switching on the basis of the mode selection switch information M. The switch 215 performs switching on the basis of the switch information S.

The modes are an intra mode (INTRA), an inter mode (INTER), and a non-encoding mode (NOT_CODED), and each of these modes corresponds to each macro block. That is, an INTRA macro block is a picture domain to be subjected to intra-frame encoding, an INTER macro block is a picture domain to be subjected to inter-frame encoding, and a NOT_CODED macro block is a picture domain requiring no encoding. These pieces of information are exchanged between the mode selector 216 and a refresh decision circuit 217 by mode selection information MODE.

The refresh decision circuit 217 decides whether each macro block is a motion domain or a stationary domain and decides on the basis of this decision result whether refresh is to be performed.

In a macro block of the non-encoding mode (NOT_CODED) in which a picture changes little from one frame to another, there is almost no chance of an error being mixed and so the influence of an error from another macro block is not mixed. Accordingly, it is decided that a macro block which is NOT_CODED for a fixed frame time or longer in the past is a stationary domain. For the stationary domain, the refresh period can be set to be longer than that for the motion domain.

Decision of the stationary domain depends upon the number of frames which cannot be successively decoded due to errors. If frames which cannot be successively decoded due to errors are present, it is necessary to consider a case in which a motion domain exists between these frames and so a frame can change. Accordingly, if an error exists in one frame, one cycle
if errors exist in two frames, one cycle + 1
if errors exist in three frames, one cycle + 2
.
.
if errors exist in L frames, one cycle + L − 1
.
.

Generally, assuming the number of frames which cannot be successively decoded due to errors is L, no refresh needs to be performed for a macro block continuously found to be stationary over (one cycle+L−1) frames in the past. That is, since a picture in a frame before a frame which cannot be decoded due to an error is correct, recovery of refresh in two cycles can be ensured.

On the basis of this principle, the present invention decreases the number of intra modes for refresh.

The principle of the present invention will be described below with reference to FIGS. 11 and 12.

Figure 11:
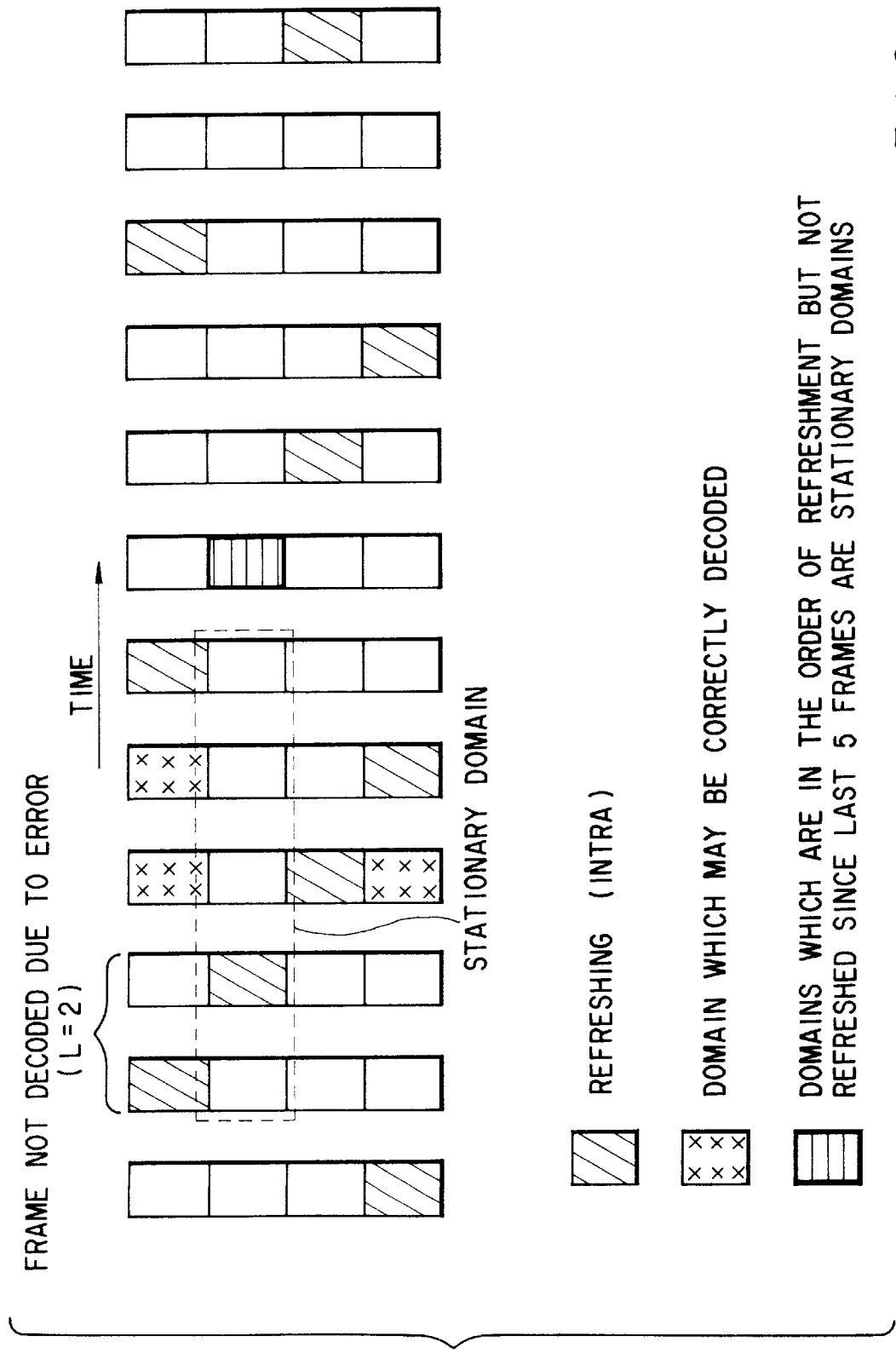
FIG. 11 is a view for explaining intra slice and the operation of a refresh decision circuit.
Figure 12:
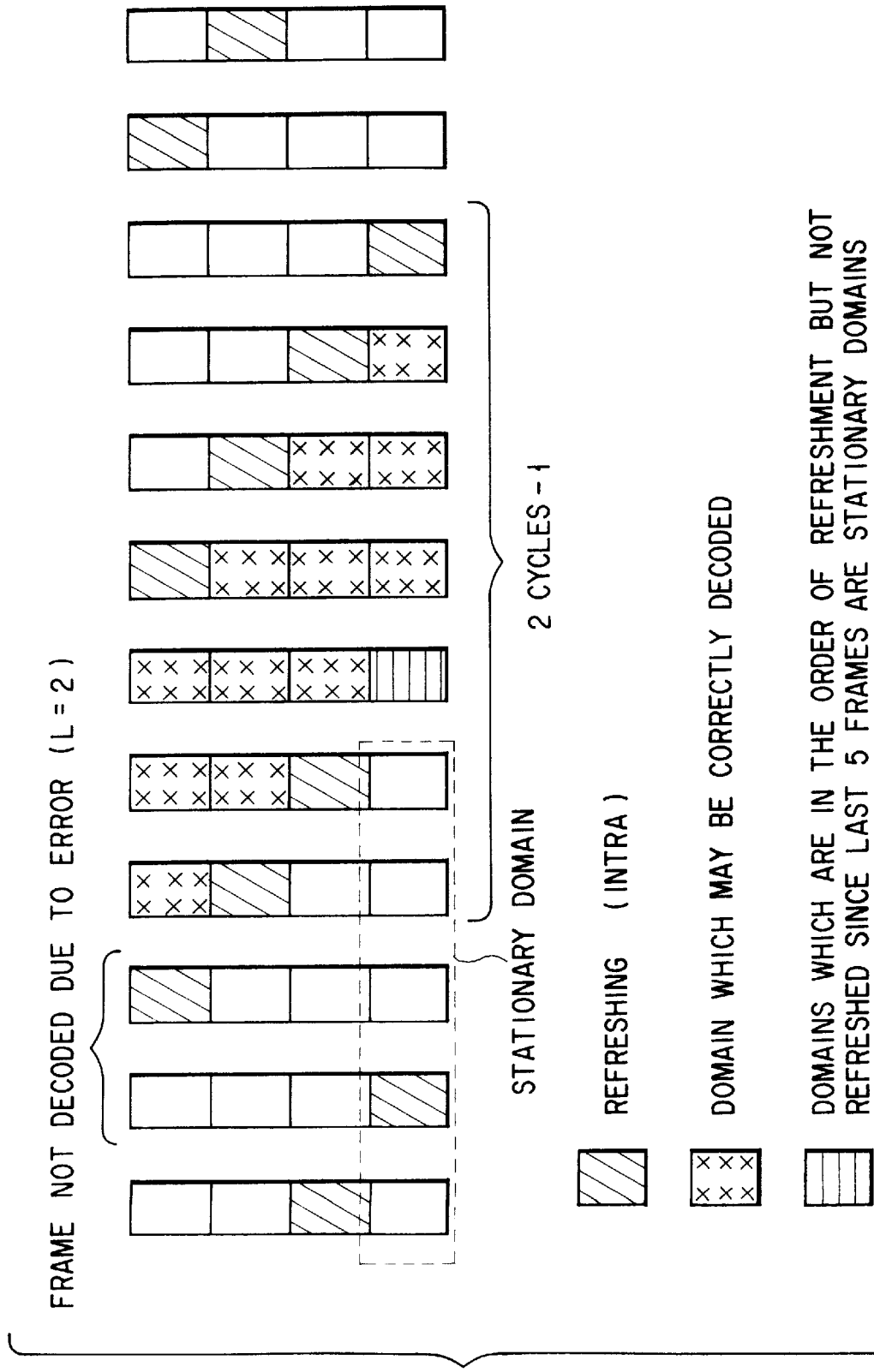
FIG. 12 is a view for explaining intra slice and the operation of the refresh decision circuit.

FIGS. 11 and 12 illustrate the operation of refresh in which the operation in the case of intra slice is viewed just from the side of frames in time series. Note that FIGS. 11 and 12 illustrate a case where the number of frames which cannot be decoded due to errors is L=2. Note also that the period of refresh is four frames and the frames are refreshed downward.

In FIG. 11, assuming the number of frames which cannot be successively decoded is 2 (L=2), it is decided that these frames form a stationary domain if NOT_CODED continues over 4+2−1=5 frames. In this case, no refresh is necessary because a correct reference picture can be used as a reference picture in the next frame. In practice, even if NOT_CODED does not continue, a macro block of the intra (INTRA) mode for refresh can be included in a stationary domain if it can be decided from an input picture signal that the macro block is NOT_CODED.

FIG. 12 shows the worst case when the processing as explained in FIG. 11 is performed. As in FIG. 12, if a frame memory is not rewritten for a macro block having an error, it is assured that the range over which the error propagates is recovered in (two cycles−1) times in the worst case.

When compared to conventional refresh, the number of macro blocks to be encoded in the intra mode in a stationary domain decreases. Accordingly, the quantization parameter can be decreased for the same rate, and this improves the picture quality.

Figure 13:
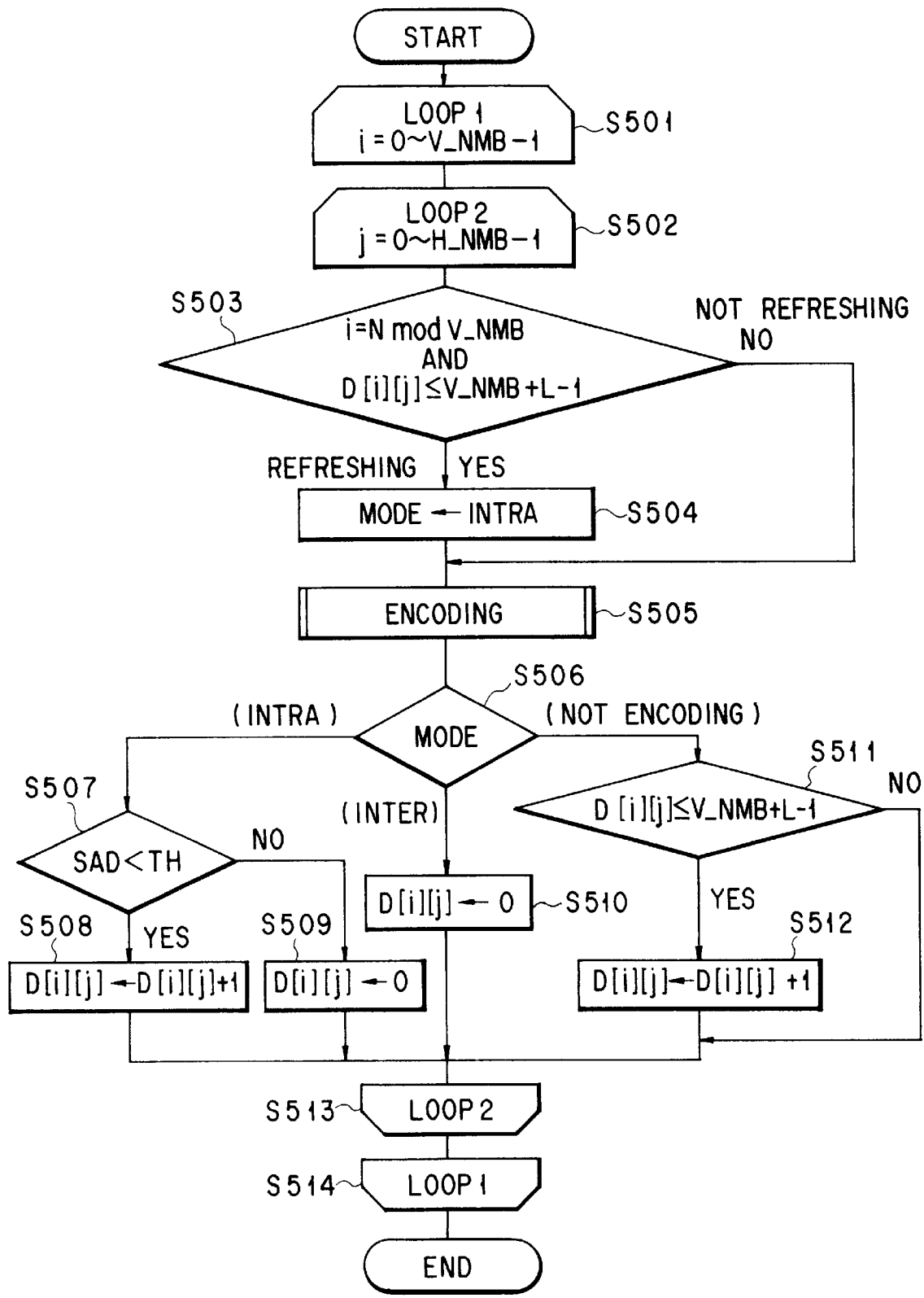
FIG. 13 is a flow chart for explaining the operation of the refresh decision circuit, which illustrates a case where refresh is performed by intra slice.

FIG. 13 is a view for explaining the processing of the refresh decision circuit 217, which is a flow chart showing the processing performed for one frame. FIG. 13 illustrates an operation when refresh is performed by intra slice having one macro block line for one frame.

In FIG. 13, reference symbols i and j represent the vertical and horizontal addresses, respectively, of a macro block in a frame; V_NMB and H_NMB, the numbers of macro blocks in the vertical and horizontal directions, respectively, in a frame; and N, the frame number of an encoded frame counted from 0. A two-dimensional array D[i][j] stores information concerning a motion domain and a stationary domain in each macro block.

The refresh decision circuit 217 operates when it receives a frame number N and mode selection information MODE from the mode selection circuit 216. If the macro blocks should be refreshed, the circuit 217 rewrites the information MODE to INTRA, which is supplied to the mode selection circuit 216. Further, the circuit 217 updates the array D which contains information relating to the motion domain and the stationary domain.

The operation of the refresh decision circuit 217 will be explained with reference to the flow chart of FIG. 13. The operation comprises two loops 1 and 2. The first loop 1 includes Steps 501 and 514, and the second loop 1 includes Steps 502 and 513.

First, in Step 503 the refresh decision circuit 217 determines whether each macro block contained in a frame needs to be refreshed or not. More precisely, the circuit 217 determines that the macro block should be refreshed, if the remainder obtained of dividing the frame number N by V_NMB equals the vertical address i of the macro block and if D[i][i] is equal to or less than V_NMB+L−1. If Yes, the operation passes to Step 504, in which the circuit 217 rewrites MODE to INTRA. If No, the operation jumps to Step 505, in which the macro block is encoded. Thereafter, in Step 506 the circuit 217 updates the array D on the basis of the value of MODE. If MODE is INTER, the array D is initialized to "0" in Step S510.

If MODE is INTRA, the operation passes to Step 507. In Step 507, it is determined whether the absolute sum SAD of the input video signal and the video signal of the immediately preceding frame is less than a predetermined threshold value TH. If Yes, "NOT-CODED" is determined, and the array D is incremented by 1, so that the operation goes to Step 508. If No in Step 507, the array D is initialized to "0" (Step 509).

If MODE is NOT_CODED, the operation passes to Step 511. In Step 511 it is determined whether the value of the array D is equal to or less than V_NMB+L−1. If Yes, the value of the array D is increased by 1 in Step 512.

Thus, the macro block which has been regarded as NOT_CODED for a time longer than the last period (one cycle+L−1) is not refreshed even if it has become ready to be refreshed.

An intra-slice which is refreshed on the micro block line has been described with reference to the flow chart of FIG. 4. The process shown in FIG. 4 can be applied to an intra-column for refreshing the blocks in units of micro block column.

FIG. 14 is a flow chart explaining how refresh decision circuit 217 processes each frame in the case where an intra-column is refreshed.

Shown in FIG. 14 are: the vertical address i of the macro block contained in a frame; the horizontal address j thereof; the number V_NMB of macro blocks arranged in the frame in the vertical direction; the number H_NMB of macro blocks arranged in the fane in the horizontal direction; and the ordinal number N of any coded frame, counted from "0." The two-dimensional array D[i][j] stores information relating to the motion domain and the stationary domain. The array D is initialized at the value H_NMB+L, on the assumption that the frame has no errors when N=0, that is, when the first intra macro block is encoded in its entirety.

As seen from the flow chart of FIG. 14, the refresh decision circuit 217 receives the frame number N and mode selection information MODE from the mode selection circuit 216. If each macro block must be refreshed, the circuit 217 rewrites the information MODE to INTRA, which is supplied to the mode selection circuit 216. Then, the circuit 217 updates the array D which contains information relating to the motion domain and the stationary domain.

First, in Step 601 the refresh decision circuit 217 initializes a flag B at TRUE in order to achieve a long-term refreshing. The operation comprises two loops 1 and 2. The first loop 1 includes Steps 602 and 617, and the second loop 1 includes Steps 603 and 616.

Next, in Step 504 the refresh decision circuit 217 determines whether each macro block contained in a frame needs to be refreshed or not. To be more specific, the circuit 217 determines that the macro block should be refreshed, if the remainder obtained by dividing the frame number N by V_NMB equals the horizontal address j of the macro block and if D[i][i] is equal to or less than H_NMB+L−1. If Yes, the operation passes to Step 605, in which the circuit 217 rewrites MODE to INTRA. If No, the operation jumps to Step 606, in which the macro block is encoded. Thereafter, in Step 607 the circuit 217 updates the array D on the basis of the value of MODE. If MODE is INTER, the array D is initialized to "0" in Step S611.

If MODE is INTRA, the operation passes to Step 608. In Step 608, it is determined whether the absolute sum SAD of the input video signal and the video signal of the immediately preceding frame is less than a predetermined threshold value TH. If Yes, the operation goes to Step 609, in which the value of the array D is increased by 1. If No in Step 608, the operation passes to Step 610, in which the array D is initialized to "0."

If MODE is NOT_CODED, the operation passes to Step 612. In Step 612 it is determined whether the value of the array D is equal to or less than H_NMB+L−1. If Yes, the value of the array D is increased by 1 in Step 613. If the value of the array D is greater than H_NMB+L−1 and if the flag LB is set at TRUE in Step 614, the array D is initialized to "0" and the flag LB is set at FALSE.

In the operation illustrated in FIG. 14, the array D is initialized at the value H_NMB+L in the first frame. Therefore, the macro block which has been regarded as NOT_CODED continuing from the second frame is not refreshed even if it has become ready to be refreshed. Macro blocks that have been regarded as NOT_CODED for a time longer than a period of one cycle+L−1 are generally not refreshed, either. Nonetheless, a long-term refreshing is guaranteed so that only one of the macro blocks regarded as NOT_CODED for a time longer than a period of one cycle+L−1 may be forcedly changed to "0" to be encoded to INTRA in the next refreshing.

In the third embodiment, macro blocks are encoded in units of frames. Needless to say, they can be encoded in units of fields.

In the third embodiment, the refresh decision circuit 217 determines that a domain where an inter-frame picture changes little for a time longer than a predetermined frame perioβ is a stationary domain, on the basis of the input video signal and the video signal of the immediately preceding frame. When the domain is found to be stationary, the refreshing cycle is set longer. Hence, less macro blocks need to be encoded at the stationary domain in the intra-encoding mode, than in the conventional refresh operation. This decreases the quantization parameter, ultimately improving the picture quality.

A video decoding apparatus according to the fourth embodiment of the invention will be described.

Figure 15:
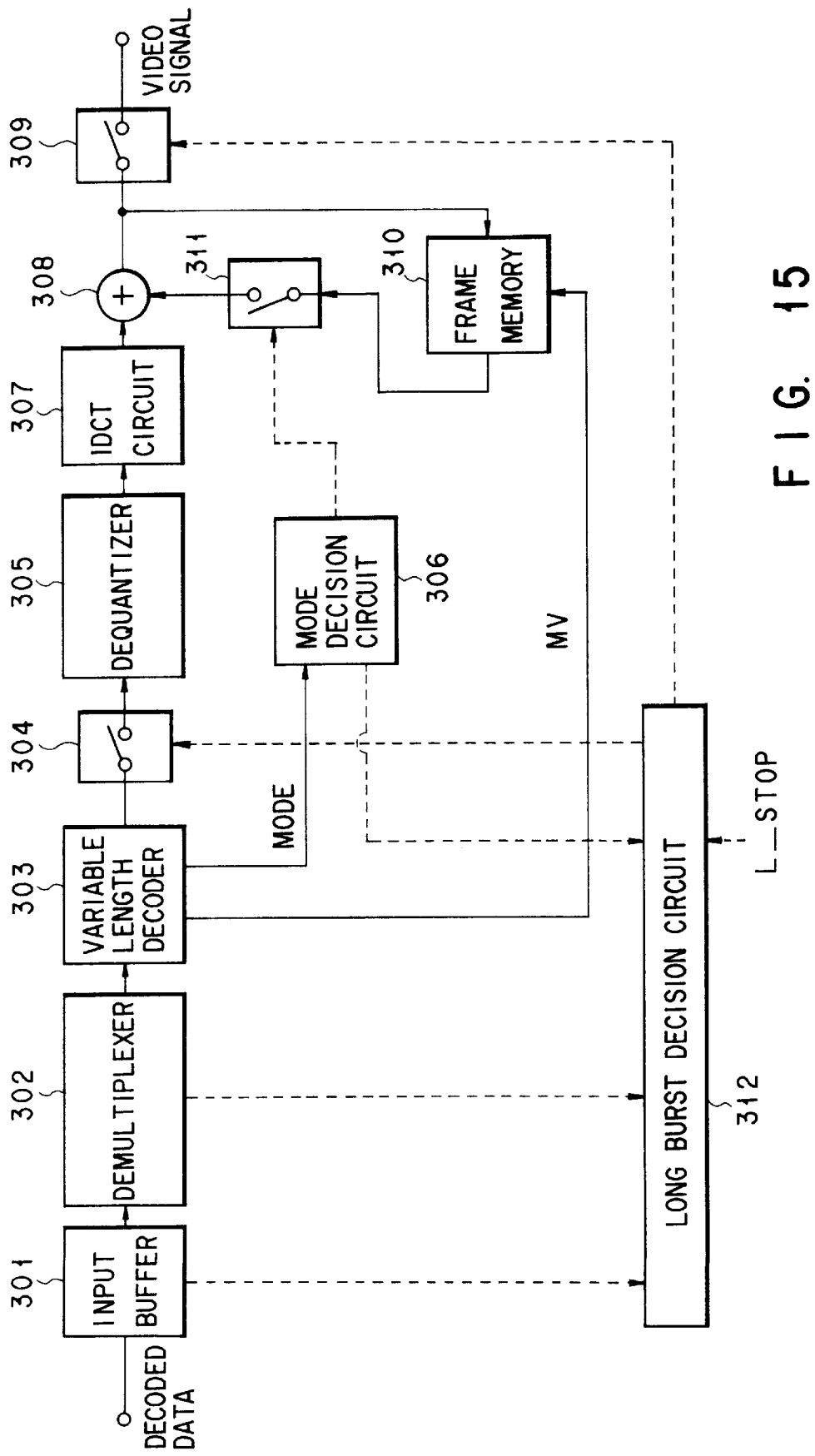
FIG. 15 is a block diagram of a video decoding apparatus according to the fourth embodiment of the present invention.

FIG. 15 is a block diagram of the fourth embodiment. As seen from FIG. 15, the encoded data supplied through a transfer path or a storage medium is temporarily stored in an input buffer 301 and then supplied to a demultiplexer 302. The demultiplexer 302 demultiplexer the encoded data, frame by frame, on the basis of prescribed syntax. The data thus demultiplexer is input to a variable-length decoder 303. The decoder 303 decodes the data items of various syntaxes, thereby generating mode information MODE.

The mode information MODE is input to a mode decision circuit 306. The circuit 306 turns on switches 309 and 311 if the mode information MODE is NOT_CODED, whereby the reconstruction picture signal stored as reference picture in a frame memory 310 is output in the form of a motion-picture signal from the video decoding apparatus.

If the mode information MODE is INTRA, the switch 311 is turned off. In this case, the quantized DCT coefficient data obtained by the variable-length decoder 303 is input to an inverse quantization circuit 305. The circuit 305 inversely quantizes the DCT coefficient data, generating inversely quantized DCT coefficient data. This data is supplied to an IDCT circuit 307, which performs inverse discrete cosine transform (IDCT) on the data, generating a reconstruction picture signal. The reconstruction picture signal is stored in the frame memory 310 in the form of reference picture. The signal, i.e., a motion picture signal, is output through the switch 309 from the video decoding apparatus.

If the mode information MODE is INTER, the switch 311 is turned on. In this case, too, the quantized DCT coefficient data obtained by the variable-length decoder 303 is input to an inverse quantization circuit 305, which inversely quantizes the DCT coefficient data, generating inversely quantized DCT coefficient data, and the data thus generated is supplied to an IDCT circuit 307, which performs inverse discrete cosine transform (IDCT) on the data, generating a reconstruction picture signal. The reconstruction picture signal is supplied to an adder 308. Meanwhile, one of the storage areas of the frame memory 310 is designated by the motion-vector data MV generated by the variable-length decoder 303. The reference picture signal stored in the storage area thus designated is supplied to the adder 308, too. The adder adds the reconstruction picture signal to the reference picture signal, generating a reconstruction picture signal. This signal is stored as a reference picture signal in the frame memory 310 and is output as a motion picture signal via the switch 309 from the video decoding apparatus.

The video decoding apparatus comprises a long-burst decision circuit 312. The circuit 312 monitors the amount of data stored in the input buffer 301 and the amount of one-frame code being processed in the demultiplexer 302. The circuit 312 determines that the frame is a long burst if the amount of data in the input buffer 301 is less than the storage capacity of the buffer 301 and if the amount of one-frame code is less than a predetermined value. If the frame is regarded as a long burst, the switch 304 is operated, inhibiting the components connected to the output of the switch 304 from operating.

As for any frame succeeding the frame regarded as a long burst, each macro block which is found to be INTRA by the mode decision circuit 306 is decoded again by turning the switch 304. Those macro blocks of the frames succeeding the long burst frame which take the same position are subjected to ordinary decoding.

The switch 304 is turned of if no macro blocks are found to be INTRA by the mode decision circuit 306 after the components connected to the output of the switch 304 are inhibited from operating. In this case, the ordinary decoding is not performed on the macro blocks.

A display-prohibiting period L_STOP is externally set in accordance with the refresh cycle adapted in the video decoding apparatus. During this period L_STOP the switch 309 remains off so that no motion picture is displayed for a prescribed time which begins at the frame containing a motion picture signal having a long burst.

As long as the video decoding apparatus operates correctly, the input buffer 301 neither overflows nor underflows. Should the input buffer 301 underflows, it would indicate that the amount of one-frame code is much greater than the predetermined value. Thus, some frames may not be correctly decoded because errors in the transfer path or the storage medium destruct the sync codes of the frames, even if the video decoding apparatus operates correctly. Namely, the sync codes of the frames can be considered to be spaced apart greatly.

If the amount of one-frame code is equal to or greater than the predetermined value, e.g., 1 second, it can be inferred that at least several frames cannot be decoded. In this case, it is determined that a long burst has mixed into the motion picture signal. Assume that a frame containing a long burst is decoded without processing the frame at all, a picture containing errors will be displayed. To avoid it, this frame is not decoded so that the picture corresponding to the immediately preceding frame may be continuously displayed.

The picture corresponding to the frame succeeding the frame containing a long burst may be far from clear since the reference picture is not correct in the case of a macro block of INTER mode. In the case of a macro block of INTRA mode, the picture can be decoded correctly, and a clear image can be constructed from the succeeding macro block of either INTER mode or non-encoding mode unless motion compensation is effected at that storage area of the frame memory 310 in which an incorrect reference picture signal is stored.

Figure 16:
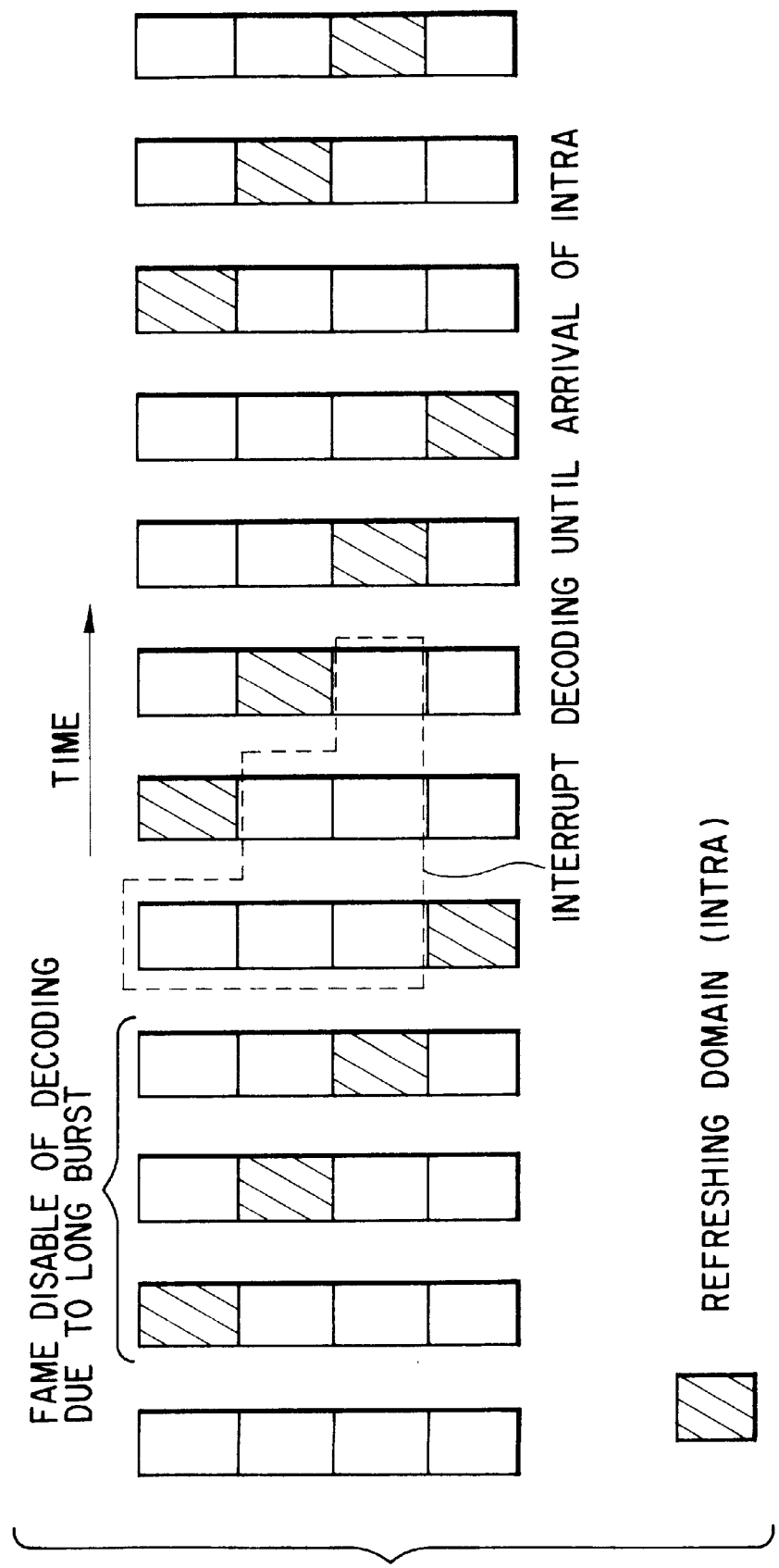
FIG. 16 is a view for explaining the operation of a long burst decision circuit.
Figure 18:
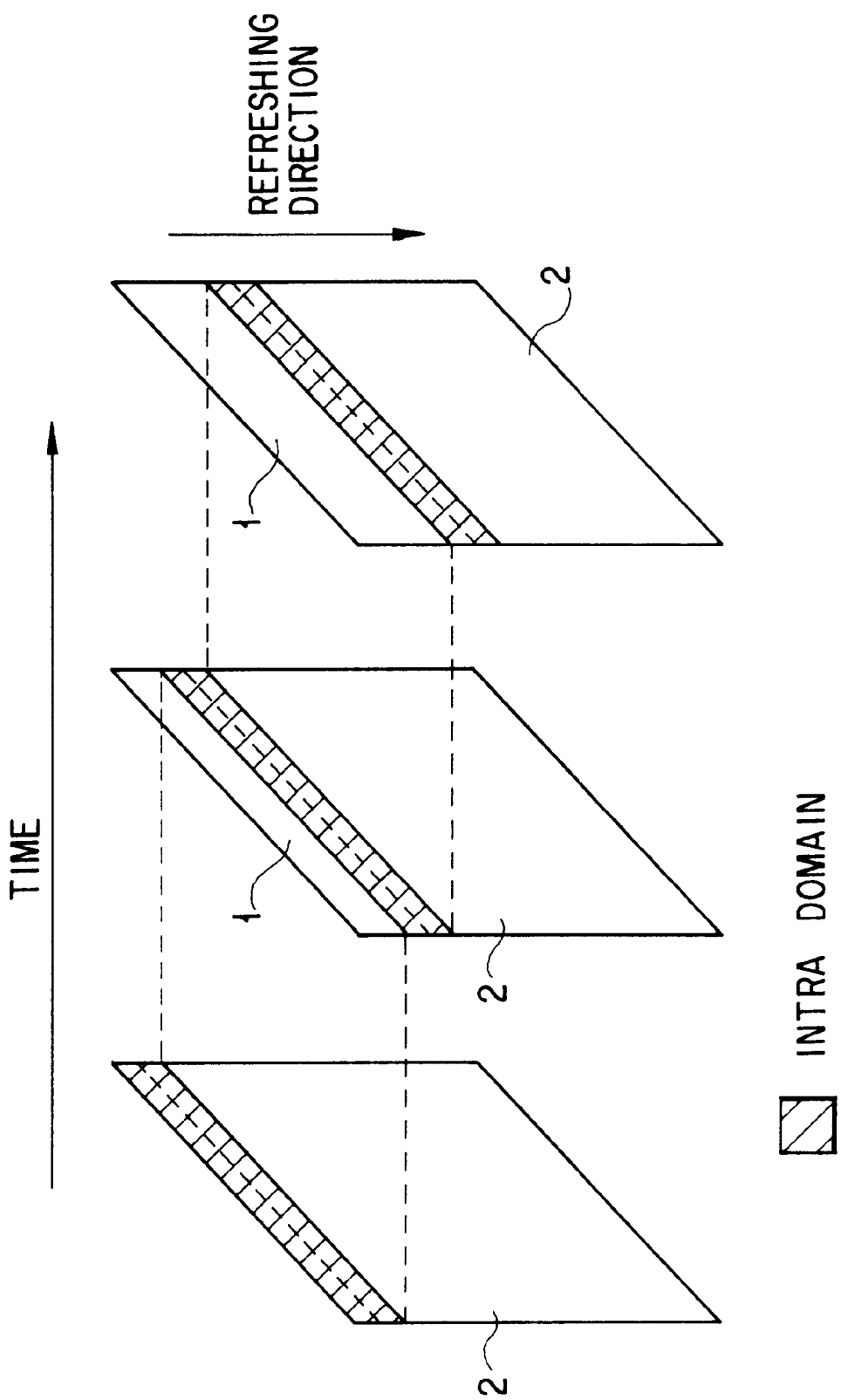
FIG. 18 is a diagram for explaining refreshing.

Thus, as shown in FIG. 16, decoding of any frame succeeding a frame containing a long burst is inhibited until a macro block of INTRA mode is decoded. In other words, frames are decoded once a macro block of INTRA mode has been decoded. The frames appear as if partly decoded once the macro block of INTRA mode has been decoded, even if the display is not stopped. Hence, the displayed picture is rather clear. When the display is stopped while the picture is recovering, the picture will be recovered almost completely merely only if the video decoding apparatus stops the display for one refresh cycle.

In the fourth embodiment, macro blocks are encoded in units of frames. They can of course be encoded in units of fields.

A video coding apparatus according to the fifth embodiment of the present invention will be described. The fifth embodiment is identical in structure to the third embodiment illustrated in FIG. 10.

In a conventional intra-slice or intra-column, any micro block refreshed must have its motion vector limited before the next frame is encoded. The global motion vector of the micro block may be limited in the global motion compensation mode to apply motion compensation on the entire frame. If the vector is so limited, however, not only the macro block but also the entire picture will be affected to impair the picture quality.

In the fifth embodiment, the mode selection circuit 316 does not select the global motion compensation mode for any macro block that must have its motion vector limited. Otherwise such a macro block would not be refreshed at all.

How the mode selection circuit 316 serves to refresh micro blocks of an intra-slice will be explained with reference to FIG. 17.

The global motion vector must be limited if it is downward. Therefore, the mode selection circuit 316 does not select the global motion compensation mode for any polka-dotted marco block shown FIG. 17, under the control of the a motion compensation circuit 314. The circuit 314 selects non-encoding mode (NOT_CODED) for the polka-dotted macro blocks. As a result, the motion vector limited does not the entire picture, it adversely influences the polka-dotted macro blocks only.

The video coding apparatus which is the third embodiment can be incorporated in the data source encoding section 22 of the radio communication system illustrated in FIG. 8. The video decoding apparatus which is the fourth embodiment can be incorporated in the source decoding section 33 of the radio communication system (FIG. 8). Also can the video coding apparatus and the video decoding apparatus be incorporated in the radio communication system which is shown in FIG. 9.

As has been described, the present invention can provide a video encoding apparatus which encodes input picture data at an encoding frame rate corresponding to the desired quality of a motion picture and which minimizes the delay in outputting the encoded data. Furthermore, the invention can provide a video encoding apparatus and a video decoding apparatus which serve to improve the quality of a motion picture without impairing the advantage achieved by refreshing macro blocks and which minimize the deterioration of picture quality resulting from errors contained in encoded data.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A video encoding apparatus comprising:

encoding means having an intra-encoding mode to intra-encode an input video signal and an inter-encoding mode to inter-encode the input video signal;

selection means for selecting one of the inter-encoding mode and the intra-encoding mode for each specified domain of a picture represented by the input video signal; and decision means for determining whether said each specified domain of the picture is a motion domain or a stationary domain, on the basis of the input video signal and a video signal representing a picture immediately preceding the picture represented by the input video signal, wherein said selection means causes said encoding means to periodically set an intra-encoding domain in the picture represented by the input video signal and to refresh the specified domain so as to move the intra-encoding domain in the picture, and makes a cycle of refreshing a signal for the stationary domain longer than a cycle of refreshing a signal for the motion domain.

2. A video decoding apparatus comprising:

input means for temporarily holding data generated by encoding an input video signal in one of an intra-encoding mode and an inter-encoding mode;

decoding means for decoding the data temporarily held in said input means;

memory means for storing a reference picture signal which is used to decode the data generated by encoding the input video signal in the inter-encoding mode; and rewriting means for rewriting the reference picture signal stored in the memory means, on the basis of a video signal obtained by said decoding means by decoding the data encoded in the intra-encoding mode, wherein said rewriting means determines a state of the data for each frame on the basis of the number of bits of the data temporarily held in said input means and the number of bits of one frame of the data, and when the frame is found to have errors, the rewriting means is inhibited from rewriting the reference picture signal on the basis of the frame, until said decoding means generates a video signal from data which has been encoded in the intra-encoding mode and which represents a frame having no errors.

3. A video encoding apparatus comprising:

encoding means having an intra-encoding mode to intra-encode an input video signal, a first motion compensation mode to compensate for motion of a frame and inter-encode the frame, and a second motion compensation mode to compensate for motions of parts of the frame and inter-encode the parts of the frame; and selection means for selecting one of the intra-encoding mode, the first motion compensation mode and the second motion compensation mode for each specified domain of a picture represented by the input video signal, wherein said selection means causes said encoding means to periodically set an intra-encoding domain in the frame represented by the input video signal and to refresh the specified domain so as to move the intra-encoding domain in the frame, and selects one of the intra-encoding mode and the second motion compensation mode for a domain of the picture whose motion vector needs to be limited in order to refresh the input video signal before the domain of the picture is inter-encoded.

4. A video encoding apparatus according to claim 1, wherein said each specified domain of a picture is a macro-block.

5. A video encoding apparatus according to claim 1, wherein said selection means causes said encoding means to periodically set the intra-encoding domain in the frame in units of one macro-block.

6. A video decoding apparatus according to claim 2, wherein said decoding means comprises means for demultiplexing coded data read out from the input means and means for decoding demultiplexed coded data from the demultiplexing means to output a reconstructed picture signal.

7. A video decoding apparatus according to claim 6, further comprising:

long-burst decision means for monitoring an amount of data stored in the input means and an amount of one-frame code being processed in the demultiplexing means, and determining that a frame is a long-burst frame if an amount of data in the input means is less than a storage capacity of the input means and if the amount of the one-frame code is less than a predetermined value, and said long-burst decision means inhibits decoding when said long-burst decision means determines that the frame is regarded as a long-burst frame.

8. A video decoding apparatus according to claim 2, wherein said decoding means comprises:

means for demultiplexing coded data read out from the input means;

means for variable-length-decoding demultiplexed coded data from the demultiplexing means to output mode information and quantized DCT coefficient data;

means for deciding an encoding mode of the coded data; and a reconstruction section including means for generating the reference picture signal as a reconstructed picture signal when the mode information indicates a non-encoding mode, means for generating a reconstructed picture signal obtained by subjecting the quantized DCT coefficient data to dequantization and inverse-discrete-cosine transform when the mode information indicates the intra-encoding mode, and means for generating a reconstructed picture signal obtained by subjecting the quantized DCT coefficient data to dequantizing and inverse-discrete-cosine-transform and adding dequantized and inverse-cosine-transformed data to the reference picture signal.

9. A video decoding apparatus according to claim 8, further comprising:

long-burst decision means for monitoring an amount of data stored in the input means and an amount of one-frame code being processed in the demultiplexing means, and determines that a frame is a long-burst frame if the amount of data in the input means is less than a storage capacity of the input means and if the amount of the one-frame code is less than a predetermined value, and said long-burst decision means inhibits decoding when said long-burst decision means determines that the frame is regarded as a long-burst frame.

10. A video decoding apparatus according to claim 9, wherein with respect to any frame succeeding the frame regarded as a long-burst frame, said long-burst decision means restarts the decoding for a macro-block which is found to be the intra-encoding mode.

11. A video encoding apparatus according to claim 3, wherein said each specified domain of a picture is a macro-block.

12. A video encoding method comprising the steps of:

preparing an intra-encoding mode to intra-encode an input video signal and an inter-encoding mode to inter-encode an input video signal;

selecting one of the inter-encoding mode and the intra-encoding mode for each specified domain of a picture represented by the input video signal; and determining whether said each specified domain of the picture is one of a motion domain and a stationary domain, on the basis of the input video signal and a video signal representing a frame immediately preceding a frame represented by the input video signal, wherein said selecting step includes periodically setting an intra-encoding domain in the frame represented by the input video signal, refreshing the specified domain so as to move the intra-encoding domain in the frame, and making a cycle of refreshing a signal for the stationary domain longer than a cycle of refreshing a signal for the motion domain.

13. A video decoding method comprising the steps of:

temporarily holding data generated by encoding an input video signal in one of an intra-encoding mode and an inter-encoding mode;

decoding the data temporarily held in said temporarily holding step;

storing a reference picture signal which is used to decode the data generated by encoding the input video signal in the inter-encoding mode; and rewriting the reference picture signal stored in the storing step, on the basis of a video signal obtained by said decoding step by decoding the data encoded in the intra-encoding mode, wherein said rewriting step includes determining a state of the data for each frame on the basis of the number of bits of the data temporarily held in the temporarily holding step and the number of bits of one frame of the data, and when the frame is found to have errors, inhibiting rewriting the reference picture signal on the basis of the frame having errors, until a video signal is generated which has been encoded in the intra-encoding mode and which represents a frame having no errors.

14. A video encoding method comprising the steps of:

preparing an intra-encoding mode to intra-encode an input video signal, a first motion compensation mode to compensate for motion of a frame and inter-encode the frame, and a second motion compensation mode to compensate for motions of parts of the frame and inter-encode the parts of the frame; and selecting one of the intra-encoding mode, the first motion compensation mode and the second motion compensation mode for each specified domain of a picture represented by the input video signal, wherein said selecting step includes periodically setting an intra-encoding domain in the frame represented by the input video signal, refreshing the specified domain so as to move the intra-encoding domain in the frame, and inhibiting selecting the first motion compensation mode for a domain of the picture whose motion vector needs to be limited in order to refresh the input video signal before the domain of the picture is inter-encoded.

\* \* \* \* \*